US012684418B2

(12) United States Patent　　　　(10) Patent No.:　　US 12,684,418 B2
Pan et al.　　　　　　　　　　　　　(45) Date of Patent:　　　Jul. 14, 2026

(54) COMMUNICATION METHOD AND APPARATUS

(71) Applicant: HUAWEI TECHNOLOGIES CO., LTD., Shenzhen (CN)

(72) Inventors: Qi Pan, Beijing (CN); Zhenglei Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 290 days.

(21) Appl. No.: 18/404,824

(22) Filed: Jan. 4, 2024

(65) Prior Publication Data

US 2024/0147308 A1　　May 2, 2024

Related U.S. Application Data

(63) Continuation of application No. PCT/CN2022/104239, filed on Jul. 6, 2022.

(30) Foreign Application Priority Data

Jul. 8, 2021　(CN) .......................... 202110773761.0

(51) Int. Cl.
　*H04W 28/12*　　　(2009.01)
　*H04W 40/22*　　　(2009.01)
(52) U.S. Cl.
　CPC ........... *H04W 28/12* (2013.01); *H04W 40/22* (2013.01)

(58) Field of Classification Search
None
See application file for complete search history.

(56) References Cited

U.S. PATENT DOCUMENTS

2021/0352113 A1 *　11/2021　Sodagar .................. H04L 65/60
2023/0363024 A1 *　11/2023　Kang .................... H04W 76/10
2023/0388360 A1 *　11/2023　Chen .................. H04N 21/6131

OTHER PUBLICATIONS

3rd Generation Partnership Project; Technical Specification Group Services and System Aspects; IP Multimedia Subsystem (IMS) Service Continuity; Stage 2(Release 10). total 156 pages, Dec. 2015.
BBC et al:"Generic architecture for data collection and reporting." 3GPP TSG-SA WG4 Meeting #114-e S4-210723 Electronic Meeting, May 19-28, 2021. total 5 pages.
Qualcomm Incorporated et al:"Interfaces and Formats for AF Data Collection and Event Exposure." 3GPP TSG-SA4#114-e Electronic meeting, Telco, May 19-28, 2021 S4-210951 revision of S4-210760. total 5 pages.

(Continued)

*Primary Examiner* — Hong S Cho

(57)　　　　　　ABSTRACT
A communication method and apparatus are provided to support a terminal device in indirectly sending data to a first network element via an application provider. The method includes an application provider obtaining first indication information and receiving first data information from the terminal device. The application provider sends the first data information to the first network element based on the first indication information. The first indication information indicates that the data is transmitted between the terminal device and the first network element via the application provider.

22 Claims, 13 Drawing Sheets

(56)         References Cited

OTHER PUBLICATIONS

3GPP TS 26.501 V16.3.0 (Mar. 2020), 3rd Generation Partnership Project; Technical Specification Group Services and System Aspects; 5G Media Streaming (5GMS); General description and architecture (Release 16), total 63 pages.
3GPP TS 23.502 V17.1.0 (Jun. 2021), 3rd Generation Partnership Project; Technical Specification Group Services and System Aspects; Procedures for the 5G System (5GS); Stage 2 (Release 17), total 679 pages.
3GPP TS 23.501 V17.1.1 (Jun. 2021), 3rd Generation Partnership Project; Technical Specification Group Services and System Aspects; System architecture for the 5G System (5GS); Stage 2 (Release 17), total 520 pages.
3GPP TR 26.804 V0.4.1 (Jun. 2021), 3rd Generation Partnership Project; Technical Specification Group Services and System Aspects; Study on 5G media streaming extensions (Release 17), total 80 pages.
3GPP TS 26.247 V16.4.1 (Oct. 2020), 3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 16), total 140 pages.
3GPP TS 26.501 V16.8.0 (Jun. 2021), 3rd Generation Partnership Project; Technical Specification Group Services and System Aspects; 5G Media Streaming (5GMS); General description and architecture (Release 16), total 79 pages.
Qualcomm Incorporated et al, New WID on 5GMS AF Event Exposure (EVEX), 3GPP TSG-SA4 Meeting #113 S4-210973, Electronic Meeting, Apr. 6-14, 2021, total 3 pages.

* cited by examiner

○ represents an API interface

COMMUNICATION METHOD AND APPARATUS

CROSS-REFERENCE TO RELATED APPLICATIONS

This application is a continuation of International Patent Application No. PCT/CN2022/104239 filed on Jul. 6, 2022, which claims priority to Chinese Patent Application No. 202110773761.0 filed on Jul. 8, 2021. The disclosures of the aforementioned applications are hereby incorporated by reference in their entireties.

TECHNICAL FIELD

This application relates to the communication field, and in particular, to a communication method and apparatus.

BACKGROUND

In a 5th generation media streaming (5GMS) architecture, to analyze data on a terminal device side and optimize a network, a terminal device may collect the data on the terminal device side, obtain collected information, and send the collected information to a 5GMS application function (5GMS AF) network element. For example, a media session handler (MSH) entity of the terminal device may be configured with a media stream handler (MSH) entity to collect the data on the terminal device side, the media stream handler entity obtains the collected information, and sends the collected information to the media session handler entity, and the media session handler entity sends the collected information to the 5GMS AF network element through an M5 interface.

The foregoing manner may be referred to as a direct data reporting manner. Currently, the 5GMS architecture supports only the direct data reporting manner. No specific solution is provided in the conventional technology for how the terminal device indirectly sends the information to the 5GMS AF.

SUMMARY

Embodiments of this application provide a communication method and apparatus, to support a terminal device in indirectly sending data to a first network element via an application provider.

To achieve the foregoing objectives, the following technical solutions are used in this application.

According to a first aspect, a communication method is provided. The communication method includes: An application provider obtains first indication information; the application provider receives first data information from a terminal device; and the application provider sends the first data information to a first network element based on the first indication information. The first indication information indicates that data is transmitted between the terminal device and the first network element via the application provider.

Based on the communication method provided in the first aspect, the application provider receives first the data information from the terminal device, and the application provider sends the first data information to the first network element based on the first indication information. The first indication information may indicate that the data is transmitted between the terminal device and the first network element via the application provider. In this way, the terminal device can indirectly send the data to the first network element via the application provider, to implement indirect data reporting.

In a possible design, the first indication information may further include first address information, and the first address information may indicate to send the data to a first address.

Optionally, the first address information and the first address may be changeable. For example, as the data is transmitted, the first address changes. In this way, indirect data reporting can be implemented.

In a possible design, the communication method provided in the first aspect may further include: The application provider obtains first information or second indication information, and the application provider sends the first information or the second indication information to the terminal device. The first information may be used to determine the first data information, and the second indication information may indicate the first information.

Optionally, the first information may include information related to a data collection and reporting feature.

Optionally, the second indication information may be an index of the first information.

In a possible design, the first information may include the first indication information.

For example, the first indication information and the information related to the data collection and reporting feature may be compiled into the first information, and a data reporting manner may be obtained by parsing the first information.

In a possible design, the communication method provided in the first aspect may further include: The application provider determines second information. The second information may be used to determine the first information. In this way, the second information may be compiled into the first information.

Optionally, the second information may include the information related to the data collection and reporting feature.

In a possible design, the communication method provided in the first aspect may further include: The application provider sends the second information to the first network element.

In a possible design, the second information may include the first indication information.

In a possible design, that an application provider obtains first indication information may include: The application provider determines the first indication information. Alternatively, the application provider receives the first indication information from the first network element. In other words, the first indication information may be determined by the application provider or the first network element.

In a possible design, the communication method provided in the first aspect may further include: The application provider sends the first indication information to the first network element. In this way, the first network element may receive the first data information from the application provider based on the first indication information.

In a possible design, the communication method provided in the first aspect may further include: The application provider sends the first indication information to the terminal device. In this way, the terminal device may send the first data information to the application provider based on the first indication information.

In a possible design, that the application provider sends the first indication information to the terminal device may include: The application provider sends the first indication information to an application entity of the terminal device.

In this way, after receiving the first data information from a client entity of the terminal device, the application entity of the terminal device may forward the first data information to the application provider.

In a possible design, that the application provider receives first data information from a terminal device may include: The application provider receives the first data information from the application entity of the terminal device. In other words, the first data information may be sent to the application provider by using the application entity of the terminal device.

According to a second aspect, a communication method is provided. The communication method includes: A terminal device obtains first indication information, and the terminal device sends first data information to an application provider based on the first indication information. The first indication information indicates that data is transmitted between the terminal device and a first network element via the application provider.

In a possible design, the first indication information may further include first address information, and the first address information may indicate to send the data to a first address.

In a possible design, the communication method provided in the second aspect may further include: The terminal device receives first information or second indication information from the application provider. The first information is used to determine the first data information, and the second indication information indicates the first information.

In a possible design, that a terminal device obtains first indication information may include: The terminal device receives the first indication information from the application provider. Alternatively, the terminal device receives the first indication information from the first network element.

In a possible design, the communication method provided in the second aspect may further include: An application entity of the terminal device sends first indication information to a client entity of the terminal device.

In a possible design, the communication method provided in the second aspect may further include: The client entity of the terminal device sends the first data information to the application entity of the terminal device based on the first indication information.

In a possible design, the communication method provided in the second aspect may further include: A media session handler entity of the client entity of the terminal device sends the first data information to the application entity of the terminal device based on the first indication information.

In a possible design, the communication method provided in the second aspect may further include: The application entity of the terminal device sends the first data information to the application provider based on the first indication information.

In a possible design, the first information may include the first indication information.

In addition, for technical effect of the communication method provided in the second aspect, refer to the technical effect of the communication method provided in the first aspect. Details are not described herein again.

According to a third aspect, a communication method is provided. The communication method includes: A first network element obtains first indication information, and the first network element receives first data information from an application provider based on the first indication information. The first indication information indicates that data is transmitted between a terminal device and the first network element via the application provider.

In a possible design, the first indication information may further include first address information, and the first address information may indicate to send the data to a first address.

In a possible design, the communication method provided in the third aspect may further include: The first network element obtains first information or second indication information. The first information is used to determine the first data information, and the second indication information indicates the first information.

In a possible design, that the first network element obtains first information or second indication information may include: The first network element determines the first information or the second indication information based on the first indication information.

In a possible design, the first information may include the first indication information.

In a possible design, the communication method provided in the third aspect may further include: The first network element determines the first information and/or the second indication information based on the second information. The second information may be used to determine the first information.

Optionally, the communication method provided in the third aspect may further include: The first network element determines the first information and/or the second indication information based on the second information and the first indication information.

Optionally, the communication method provided in the third aspect may further include: The first indication information may be in the second information.

In a possible design, the communication method provided in the third aspect may further include: The first network element receives the second information from the application provider.

In a possible design, that a first network element obtains first indication information may include: The first network element receives the first indication information from the application provider, or the first network element determines the first indication information.

In a possible design, the communication method provided in the third aspect may further include: The first network element sends the first indication information to the application provider.

In addition, for technical effect of the communication method according to the third aspect, refer to the technical effect of the communication method according to the first aspect. Details are not described herein again.

According to a fourth aspect, a communication apparatus is provided. The communication apparatus includes a processing module and a transceiver module.

The processing module is configured to obtain first indication information. The first indication information indicates that data is transmitted between a terminal device and a first network element by using the communication apparatus.

The transceiver module is configured to receive first data information from the terminal device.

The transceiver module is further configured to send the first data information to the first network element based on the first indication information.

In a possible design, the first indication information may further include first address information, and the first address information may indicate to send the data to a first address.

In a possible design, the processing module is further configured to obtain first information or second indication information. The transceiver module is further configured to send the first information or the second indication information to the terminal device. The first information may be used to determine the first data information, and the second indication information may indicate the first information.

In a possible design, the first information may include the first indication information.

In a possible design, the processing module is further configured to determine second information. The second information may be used to determine the first information. In this way, the second information may be compiled into the first information.

Optionally, the second information may include the information related to the data collection and reporting feature.

Optionally, the second information may include the first indication information.

In a possible design, the transceiver module is further configured to send the second information to the first network element.

In a possible design, the processing module is further configured to determine the first indication information. Alternatively, the transceiver module is further configured to receive the first indication information from the first network element.

In a possible design, the transceiver module is further configured to send the first indication information to the first network element.

In a possible design, the transceiver module is further configured to send the first indication information to the terminal device.

In a possible design, the transceiver module is further configured to send the first indication information to an application entity of the terminal device.

In a possible design, the transceiver module is further configured to receive the first data information from the application entity of the terminal device.

It should be noted that the transceiver module according to the fourth aspect may include a receiving module and a sending module. The receiving module is configured to receive data and/or signaling from the terminal device or the first network element. The sending module is configured to send data and/or signaling to the terminal device or the first network element. A specific implementation of the transceiver module is not specifically limited in this application.

Optionally, the communication apparatus according to the fourth aspect may further include a storage module. The storage module stores a program or instructions. When the processing module executes the program or the instructions, the communication apparatus in the fourth aspect is enabled to perform the method according to the first aspect.

It should be noted that the communication apparatus according to the fourth aspect may be an application provider, or may be a chip (system) or another component or component that may be disposed in an application provider. This is not limited in this application.

In addition, for technical effect of the communication apparatus according to the fourth aspect, refer to the technical effect of the communication method according to any possible implementation of the first aspect. Details are not described herein again.

According to a fifth aspect, a communication apparatus is provided. The communication apparatus includes a processing module and a transceiver module.

The processing module is configured to obtain first indication information. The first indication information indicates that data is transmitted between the communication apparatus and a first network element via an application provider.

The transceiver module is configured to send first data information to the application provider based on the first indication information.

In a possible design, the first indication information may further include first address information, and the first address information may indicate to send the data to a first address.

In a possible design, the transceiver module is further configured to receive first information or second indication information from the application provider. The first information is used to determine the first data information, and the second indication information indicates the first information.

In a possible design, the transceiver module is further configured to receive the first indication information from the application provider. Alternatively, the transceiver module is further configured to receive the first indication information from the first network element.

In a possible design, the transceiver module includes an application entity of a terminal device, and the application entity of the terminal device sends the first indication information to a client entity of the terminal device.

In a possible design, the transceiver module includes a client entity of the terminal device, and the client entity of the terminal device sends the first data information to an application entity of the terminal device based on the first indication information.

In a possible design, the transceiver module includes a client entity of the terminal device, and a media session handler entity of the client entity of the terminal device sends the first data information to an application entity of the terminal device based on the first indication information.

In a possible design, the transceiver module includes an application entity of the terminal device, and the application entity of the terminal device sends the first data information to the application provider based on the first indication information.

In a possible design, the first information may include the first indication information.

It should be noted that the transceiver module in the fifth aspect may include a receiving module and a sending module. The receiving module is configured to receive data and/or signaling from the application provider or the first network element. The sending module is configured to send data and/or signaling to the application provider or the first network element. A specific implementation of the transceiver module is not specifically limited in this application.

Optionally, the communication apparatus in the fifth aspect may further include a storage module, and the storage module stores a program or instructions. When the processing module executes the program or the instructions, the communication apparatus in the fifth aspect is enabled to perform the method according to the second aspect.

It should be noted that the communication apparatus in the fifth aspect may be the terminal device, or may be a chip (system) or another component or assembly that can be disposed in the terminal device. This is not limited in this application.

In addition, for technical effect of the communication apparatus in the fifth aspect, refer to the technical effect of the communication method according to any possible implementation of the second aspect. Details are not described herein again.

According to a sixth aspect, a communication apparatus is provided. The communication apparatus includes a processing module and a transceiver module.

The processing module is configured to obtain first indication information. The transceiver module is configured to receive first data information from an application provider based on the first indication information. The first indication information indicates that data is transmitted between a terminal device and the communication apparatus via the application provider.

In a possible design, the first indication information may further include first address information, and the first address information may indicate to send the data to a first address.

In a possible design, the processing module is further configured to obtain first information or second indication information. The first information may be used to determine the first data information, and the second indication information may indicate the first information.

In a possible design, the processing module is further configured to determine the first information or the second indication information based on the first indication information.

In a possible design, the first information may include the first indication information.

In a possible design, the processing module is further configured to determine the first information and/or the second indication information based on second information. The second information may be used to determine the first information.

Optionally, the processing module is further configured to determine the first information and/or the second indication information based on the second information and the first indication information.

Optionally, the second information may include the first indication information.

In a possible design, the transceiver module is further configured to receive the second information from the application provider.

In a possible design, the transceiver module is further configured to receive the first indication information from the application provider. Alternatively, the processing module is further configured to determine the first indication information.

In a possible design, the transceiver module is further configured to send the first indication information to the application provider.

It should be noted that the transceiver module in the sixth aspect may include a receiving module and a sending module. The receiving module is configured to receive data and/or signaling from the application provider or the terminal device. The sending module is configured to send data and/or signaling to the application provider or the terminal device. A specific implementation of the transceiver module is not specifically limited in this application.

Optionally, the communication apparatus in the sixth aspect may further include a storage module, and the storage module stores a program or instructions. When the processing module executes the program or the instructions, the communication apparatus in the sixth aspect is enabled to perform the method according to the third aspect.

It should be noted that the communication apparatus in the sixth aspect may be a first network element, or may be a chip (system) or another component or component that may be disposed in a first network element. This is not limited in this application.

In addition, for technical effect of the communication apparatus in the sixth aspect, refer to the technical effect of the communication method according to any possible implementation of the third aspect. Details are not described herein again.

According to a seventh aspect, a communication apparatus is provided. The communication apparatus includes a processor. The processor is coupled to a memory, and the memory is configured to store a computer program.

The processor is configured to execute the computer program stored in the memory, so that the communication method according to any possible implementation of the first aspect to the third aspect is performed.

In a possible design, the communication apparatus in the seventh aspect may further include a transceiver. The transceiver may be a transceiver circuit or an input/output port. The transceiver may be used by the communication apparatus to communicate with another device.

It should be noted that the input port may be configured to implement receiving functions in the first aspect to the third aspect, and the output port may be configured to implement sending functions in the first aspect to the third aspect.

In this application, the communication apparatus in the seventh aspect may be an application provider, a terminal device, or a first network element, or a chip or a chip system disposed in an application provider, a terminal device, or a first network element.

In addition, for technical effect of the communication apparatus in the seventh aspect, refer to the technical effect of the communication method according to any implementation of the first aspect to the third aspect. Details are not described herein again.

According to an eighth aspect, a communication system is provided. The communication system includes the communication apparatus according to the fourth aspect, the communication apparatus according to the fifth aspect, and the communication apparatus according to the sixth aspect.

Alternatively, the communication system includes the communication apparatus according to the fourth aspect for implementing the method according to the first aspect, the communication apparatus according to the fifth aspect for implementing the method according to the second aspect, and the communication apparatus according to the fifth aspect for implementing the method according to the third aspect.

For example, the communication system may include one or more application providers, one or more terminal devices, and one or more first network elements.

According to a ninth aspect, a chip system is provided. The chip system includes a logic circuit and an input/output port. The logic circuit is configured to implement processing functions in the first aspect to the third aspect, and the input/output port is configured to implement receiving and sending functions in the first aspect to the third aspect. Specifically, the input port may be configured to implement the receiving functions in the first aspect to the third aspect, and the output port may be configured to implement the sending functions in the first aspect to the third aspect.

In a possible design, the chip system further includes a memory. The memory is configured to store program instructions and data for implementing functions in the first aspect to the third aspect.

The chip system may include a chip, or may include a chip and another discrete component.

According to a tenth aspect, a computer-readable storage medium is provided, including a computer program or instructions. When the computer program or the instructions are run on a computer, the communication method according to any possible implementation of the first aspect to the third aspect is performed.

According to an eleventh aspect, a computer program product is provided, including a computer program or instructions. When the computer program or the instructions are run on a computer, the communication method according to any possible implementation of the first aspect to the third aspect is performed.

DESCRIPTION OF EMBODIMENTS

The following describes the technical solutions in this application with reference to the accompanying drawings.

The technical solutions in embodiments of this application may be applied to various communication systems, for example, a wireless fidelity (Wi-Fi) system, a vehicle to everything (V2X) communication system, a device-to-device (D2D) communication system, an internet of vehicles communication system, a 4th generation (4G) mobile communication system, for example, a long term evolution (LTE) system or a worldwide interoperability for microwave access (WiMAX) communication system, a 5th generation (5G) mobile communication system, for example, a new radio (NR) system, and a future communication system, for example, a 6th generation (6G) mobile communication system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, the terms such as "for example" and "such as" are used to represent giving an example, an illustration, or a description. Any embodiment or design scheme described as an "example" in this application should not be explained as being more preferred or having more advantages than another embodiment or design scheme. Exactly, the term "example" is used to present a concept in a specific manner.

In embodiments of this application, terms "information", "signal", "message", "channel", and "signaling" may sometimes be interchangeably used. It should be noted that meanings expressed by the terms are consistent when differences of the terms are not emphasized. Terms "of", "relevant" and "corresponding" may be interchangeably used. It should be noted that meanings expressed by the terms are consistent when differences of the terms are not emphasized.

In embodiments of this application, a subscript, for example, $W_1$, may sometimes be written in an incorrect form, for example, W1. Expressed meanings are consistent when differences are not emphasized.

The network architecture and the service scenario that are described in embodiments of this application are intended to describe the technical solutions in embodiments of this application more clearly, and do not constitute a limitation on the technical solutions provided in embodiments of this application. A person of ordinary skill in the art may know that, with evolution of the network architecture and emergence of new service scenarios, the technical solutions provided in embodiments of this application are also applicable to similar technical problems.

Figure 1:
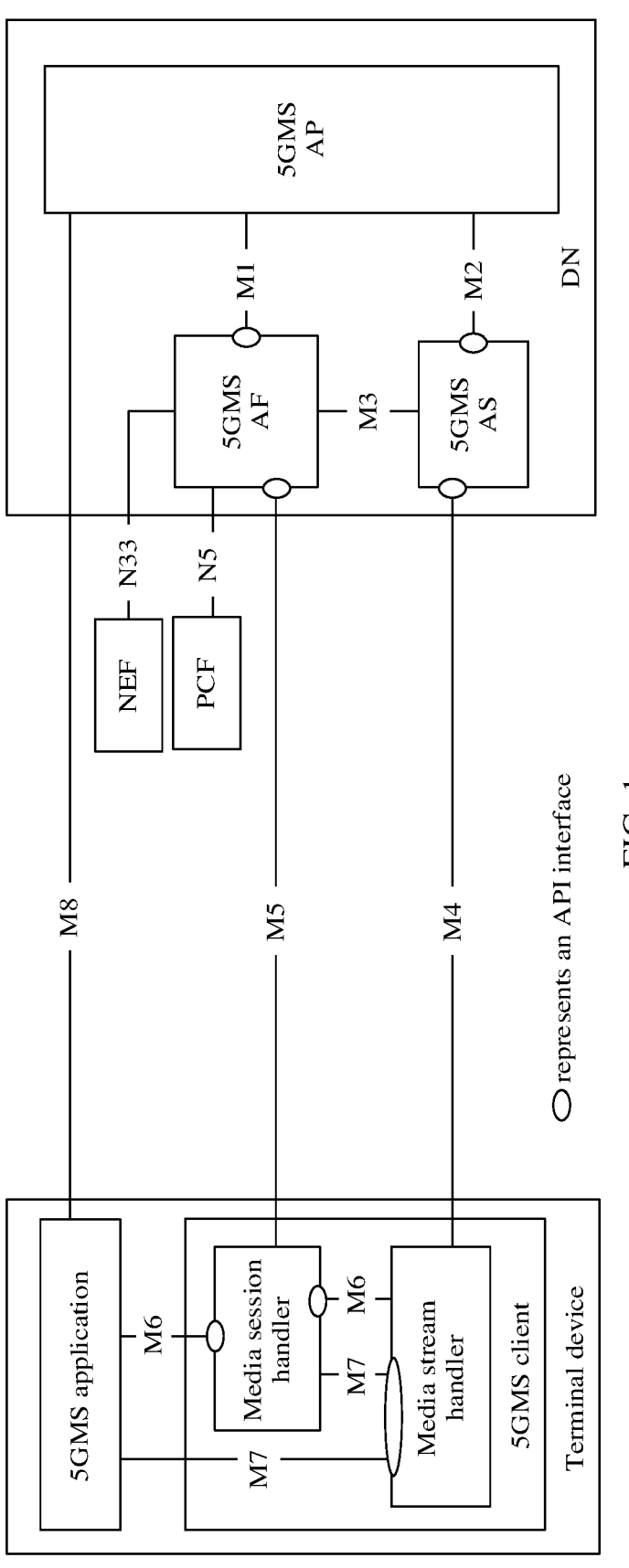
FIG. 1 is a schematic diagram of an architecture of a communication system according to an embodiment of this application.

For ease of understanding embodiments of this application, a communication system shown in FIG. 1 is first used as an example to describe in detail a communication system applicable to embodiments of this application. For example, FIG. 1 is a schematic diagram of an architecture of a communication system to which a communication method according to an embodiment of this application is applicable.

FIG. 1 shows a 5G media streaming architecture for a 5G media streaming (5GMS) service.

As shown in FIG. 1, the 5GMS architecture includes but is not limited to one or more of the following: a 5GMS application (5GMS-aware application), a 5GMS client, a 5GMS application function (5GMS AF) network element, and a 5GMS application provider (5GMS AP). Optionally, the 5GMS architecture may further include one or more of the following: a 5GMS application server (5GMS AS), a network exposure function (NEF) network element, and a policy control function (PCF) network element. The 5GMS application provider may be referred to as a 5GMS application service provider (5GMS ASP). In this application, the 5GMS application provider is used as an example for description.

A data network (DN) is an operator network that provides a data transmission service for a terminal device. For example, the DN may include but is not limited to one or more of the following: the 5GMS AF network element, the 5GMS AS network element, and the 5GMS AP.

The 5GMS application may be considered as an application on a terminal device side. The 5GMS application may be referred to as a 5GMS application entity, an application entity, a 5GMS app, or the like, and the 5GMS client may be referred to as a 5GMS terminal, a 5GMS terminal entity, a 5GMS client entity, or the like. As shown in FIG. 1, the terminal device may include a 5GMS application entity and a 5GMS client entity. The 5GMS client entity may include a media session handler (MSH) entity and a media stream handler MSH) entity. Optionally, for a downlink media streaming service, the media stream handler entity may also be referred to as a media player (MP).

The 5GMS application entity and the media stream handler entity may communicate with each other through an application programming interface (API) (for example, an M7 interface), the media stream handler entity and the media session handler entity may communicate with each other through an application programming interface (for example, an M6 interface), and the media session handler entity and the 5GMS application entity may communicate with each other through an application programming interface (for example, an M6 interface).

The media session handler entity and the 5GMS AF may interact with each other through an application programming interface (for example, an M5 interface), to implement creation, control, and transmission of a media session.

The media stream handler entity and the 5GMS AS may perform media stream transmission, encoding, decoding, and playing (for a downlink service) through an application programming interface (for example, an M4 interface), and provide an application programming interface for the upper-layer 5GMS application entity and media session handler entity to implement media playing and media session control.

Figure 3:
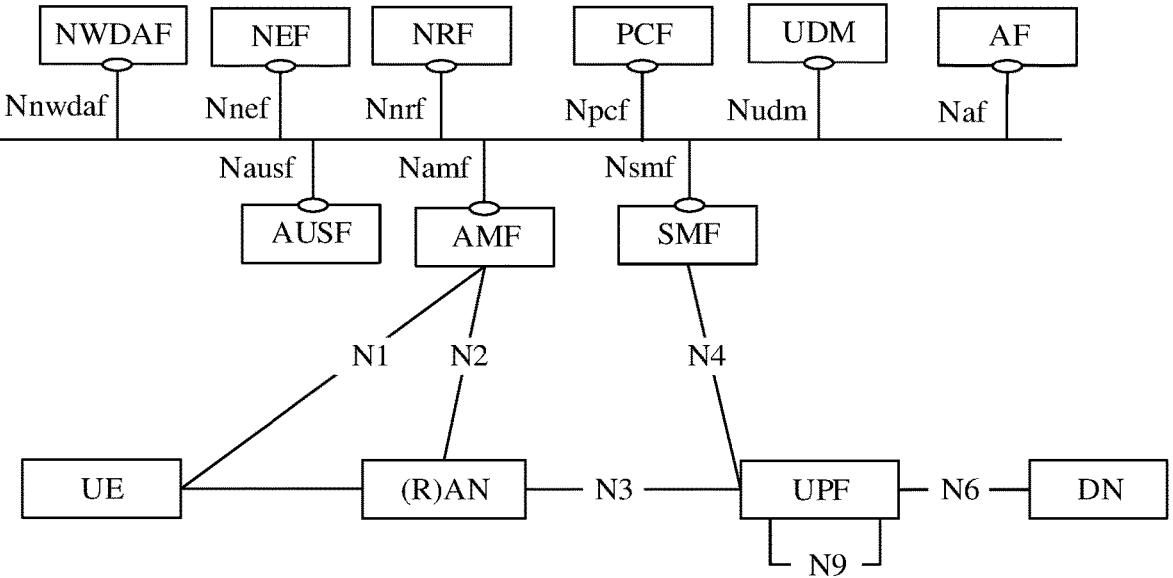
FIG. 3 is a schematic diagram of a network architecture according to an embodiment of this application.

The NEF network element and the PCF network element are network elements in a 5G architecture (as shown in FIG. 3). The 5GMS AF network element may interact with a 5G network through an application programming interface (for example, an N33 interface or an N5 interface).

The 5GMS application provider is mainly a content provider server of the 5GMS application of the terminal device. The 5GMS application provider and the 5GMS application entity may be deployed by an application service vendor, and may communicate with each other through an application programming interface (for example, an M8 interface).

The 5GMS AF and the 5GMS AS may communicate with each other through an application programming interface (for example, an M3 interface). When the 5GMS AF and the 5GMS AS are in an external untrusted zone, the application programming interface depends on a third-party provider. The 5GMS AF is also a type of AF defined by 3GPP, and is intended to implement information exchange between the 5GMS application provider and a 3GPP network, for example, capability exposure or parameter provision. The 5GMS AF is an AF of a dedicated media streaming service. The 5GMS AS may be deployed and managed by a mobile network operator (MNO), or may be provided by an external third-party application, and serves as a media streaming application server, for example, similar to a content delivery network (CDN) server.

The terminal device in embodiments of this application may be a terminal having a wireless transceiver function, or a chip or a chip system that may be disposed in the terminal. The terminal device may also be referred to as user equipment (UE), a user apparatus, an access terminal, a subscriber unit, a subscriber station, a mobile station (MS), a remote station, a remote terminal, a mobile device, a user terminal, a terminal, a terminal unit, a terminal station, a terminal apparatus, a wireless communication device, a user agent, or a user apparatus.

For example, the terminal device in embodiments of this application may be a mobile phone, a wireless data card, a personal digital assistant (PDA) computer, a laptop computer, a tablet computer (Pad), a computer with a wireless transceiver function, a machine type communication (MTC) terminal, a virtual reality (VR) terminal device, an augmented reality (AR) terminal device, an internet of things (IoT) terminal device, or a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home (for example, a game console, a smart television, a smart speaker, a smart refrigerator, or a fitness apparatus), a vehicle-mounted terminal, and an RSU having a terminal function. The access terminal may be a cellular phone, a cordless phone, a session initiation protocol (SIP) phone, a wireless local loop (WLL) station, a personal digital assistant (PDA), a handset having a wireless communication function, a computing device, another processing device connected to a wireless modem, a wearable device, or the like.

For another example, the terminal device in embodiments of this application may be an express delivery terminal in smart logistics (for example, a device that can monitor a vehicle location of goods, or a device that can monitor a temperature and humidity of goods), a wireless terminal in smart agriculture (for example, a wearable device that can collect related data of poultry and animals), a wireless terminal in smart buildings (for example, a smart elevator, a fire monitoring device, or a smart meter), a wireless terminal in smart healthcare (for example, a wearable device that can monitor a physiological status of a person or an animal), a wireless terminal in intelligent transportation (for example, a smart bus, a smart vehicle, a shared bicycle, a charging pile monitoring device, a smart traffic light, a smart monitoring device, or a smart parking device), or a wireless terminal in intelligent retail (for example, a vending machine, a self-service checkout machine, or an unmanned convenience store) For example, the terminal device in this application may be a vehicle-mounted module, a vehicle-mounted component, a vehicle-mounted chip, or a vehicle-mounted unit that is built in a vehicle as one or more components or units. The vehicle uses the vehicle-mounted module, the vehicle-mounted component, the vehicle-mounted chip, or the vehicle-mounted unit that is built in the vehicle, to implement a method provided in this application.

Figure 2:
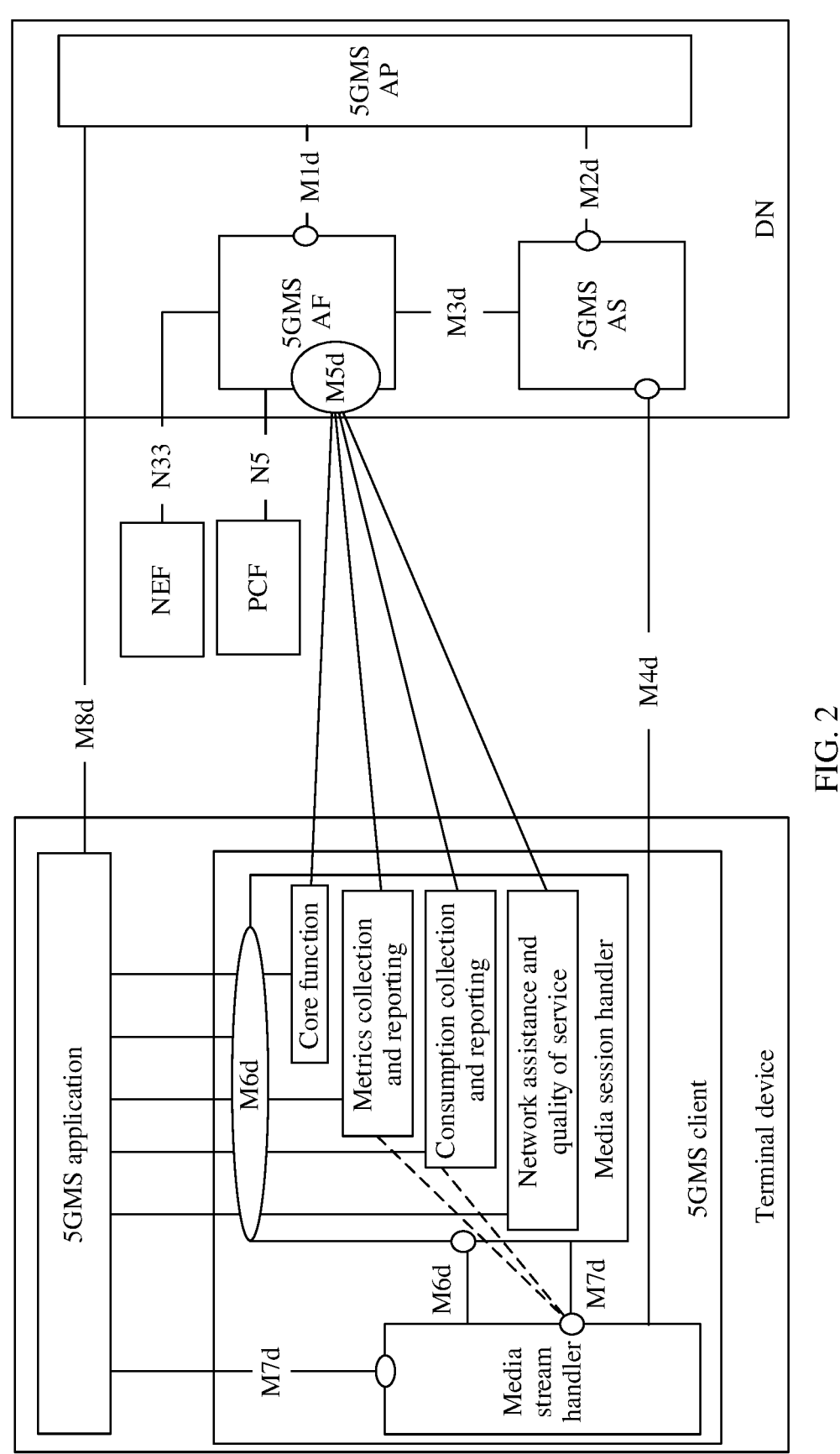
FIG. 2 is a schematic diagram of an architecture of another communication system according to an embodiment of this application.

FIG. 2 is a schematic diagram of an architecture of another communication system according to an embodiment of this application. FIG. 2 is a 5G media streaming architecture oriented to a downlink media streaming service, and may be applied to a scenario in which a terminal device selects, in a live broadcast or on-demand manner, a media stream for playing.

It should be noted that a communication method provided in embodiments of this application is applicable to an uplink communication scenario and a downlink communication scenario, and the downlink communication scenario is used as an example for description.

As shown in FIG. 2, a terminal device side may include many sub-functions. For example, a media session handler MSH module may support but is not limited to functions of one or more of the following submodules: core function, metrics collection and reporting, consumption collection and reporting), and network assistance and quality of service (QoS) adjustment.

The core function submodule may implement core functions of session establishment, management, and control. The metrics collection and reporting submodule may perform metrics collection and reporting configuration on the terminal device side, to implement metrics collection and reporting on the terminal device side. The consumption collection and reporting submodule may collect and configure consumption information of a media streaming service on the terminal device side, and report the consumption information to a 5GMS AF side based on the configuration information. The network assistance and QoS adjustment submodule may interact with a network by using the 5GMS AF, or directly interact with a RAN, to request corresponding policy adjustment (for example, QoS adjustment) and network assistance from the network side.

For example, a media stream handler module may be used as a media access terminal device (for example, a dynamic adaptive streaming over hypertext transfer protocol (DASH) terminal device), and may support but is not limited to functions of one or more of the following submodules: media data decryption, consumption policy and log recording, digital rights management (DRM) client, media data decoding, and media display and rendering.

For example, a 5GMS application provider may create a service provisioning session, and send a related feature, for example, a metrics collection and reporting feature, to the 5GMS AF. The 5GMS AF determines service access information (SAI) based on feature information sent by the 5GMS application provider, and returns the SAI or index information of the SAI to the 5GMS application provider. When the terminal device starts a media streaming service, the terminal device obtains the SAI through an M8 or M5 interface, and performs configuration and execution based on the feature in the SAL. For example, a 5GMS terminal device configures a feature based on a corresponding subfunction in the obtained SAI.

A metrics collection feature is used as an example. After obtaining the SAI, a 5GMS client configures a media stream handler entity to perform metrics collection based on the configuration information in the SAI, to obtain metrics collection information, and configures the media stream handler entity to send the metrics collection information to a media session handler entity MSH based on a configured reporting periodicity. The MSH sends the metrics collection information to the 5GMS AF through the M5 interface, to complete metrics collection on the terminal device side.

It should be noted that a 5GMS network element in embodiments of this application may be an 5GMSd (5G media streaming download, 5GMSd) network element for a downlink media streaming service. The 5GMS network element in embodiments of this application may be a data collection (data collection, DC) network element, and is not limited to a media streaming service for general data collection. For example, the 5GMS client may be a DC client, and the 5GMS AF network element may be a DC AF network element.

It should be noted that a communication method provided in embodiments of this application is applicable to the terminal device, the 5GMS application provider, and the 5GMS AF shown in FIG. 1 or FIG. 2. For specific implementation, refer to the following method embodiments. Details are not described herein.

It should be noted that, the solutions in embodiments of this application may also be used in another communication system, and a corresponding name may also be replaced with a name of a corresponding function in the another communication system.

It should be understood that FIG. 1 is merely a simplified schematic diagram of an example for ease of understanding. The communication system may further include another device not drawn in FIG. 1.

To make embodiments of this application clearer, the following collectively describes some content and concepts related to embodiments of this application.

1. 5G Architecture

FIG. 3 is an example schematic diagram of a network architecture of a 5G system based on a service-oriented interface.

As shown in FIG. 3, the 5G system may include an authentication server function (AUSF) network element, an access and mobility management function (AMF) network element, a data network (DN), a unified data management (UDM) network element, a PCF network element, a (radio) access network ((radio) access network, (R)AN) network element, a UPF network element, user equipment (UE) (which may also be referred to as a terminal device), an application function (AF) network element, a session management function (SMF) network element, a network data analysis function (NWDAF), an NEF network element, and a network repository function (NRF)

For ease of description, the (R)AN network element, the AMF network element, the SMF network element, the UDM network element, the UPF network element, the PCF network element, and the like are respectively represented by using RAN, AMF, SMF, UDM, UPF, a PCF, and the like in the following.

The 5G system is divided into two parts: an access network and a core network. The access network is used to implement a function related to wireless access, and mainly includes the RAN. The core network is used for network service control, data transmission, and the like. The core network includes a plurality of network elements, and mainly includes the AMF, the SMF, the UPF, the PCF, the UDM, and the like.

Functions of some network elements in FIG. 3 are as follows.

The AMF is mainly responsible for signaling processing, for example, user registration management, reachability detection, SMF selection, and mobility status conversion management.

The SMF is mainly responsible for all control plane functions of terminal session management, including control session establishment, modification, and deletion, user plane node selection, and the like.

The UPF serves as an anchor point for a protocol data unit (protocol data unit, PDU) session connection, routes and forwards a data packet, serves as a mobility anchor, and serves as an uplink classifier to support routing of a service flow to the data network. The UPF may alternatively be used as a branching point to support a multi-homed PDU session, and the like.

The PCF may serve as a policy decision point, and is responsible for providing rules such as service data stream and application-based detection, gating control, QoS, and stream-based charging control.

The UDM may be configured to store user subscription data.

The AUSF provides an authentication service.

The AF may be an application server, may belong to an operator or a third party, and mainly supports interaction with a 3GPP core network to provide a service, to affect data routing decision, policy control, access network capability exposure, and the like.

The NEF securely exposes a service and a capability provided by a 3GPP network function, for example, a third party, edge computing, or an AF.

The NRF is a network element that stores information such as a network element attribute, a network element status, and a network topology relationship, and has a network element discovery function and a network element management function.

The DN may be responsible for providing an operator service, an internet access service, or a third-party service.

The NWDAF has at least one of the following functions: a data collection function and a data analytics function, for example, may provide network data collection and analytics functions based on technologies such as big data and artificial intelligence.

The RAN is a network including one or more access network devices (which may also be referred to as RAN nodes or network devices), and implements functions such as a radio physical layer function, resource scheduling and radio resource management, a radio access control and mobility management function, quality of service management, and a data compression and encryption function. The access network device is connected to the UPF through a user plane interface N3, and is configured to transmit data of the terminal. The access network device establishes a control plane signaling connection to the AMF through a control plane interface N2, to implement functions such as radio access bearer control.

The access network device is a device having a wireless transceiver function or a chip or a chip system that may be disposed in the device. The access network device includes but is not limited to: an access point (AP) in a wireless fidelity (Wi-Fi) system, for example, a home gateway, a router, a server, a switch, or a bridge, an evolved NodeB (eNB), a radio network controller (RNC), a NodeB (NodeB, NB), a base station controller (BSC), a base transceiver station (BTS), a home base station (for example, a home evolved NodeB, or a home NodeB, HNB), a baseband unit (BBU), a wireless relay node, a wireless backhaul node, a transmission point (transmission and reception point, TRP or transmission point, TP), or the like. The access network device may alternatively be a gNB or a transmission point (TRP or TP) in a 5G system, for example, a new radio (NR) system, or one antenna panel or a group of antenna panels (including a plurality of antenna panels) of a base station in a 5G system. The access network device may alternatively be a network node, for example, a baseband unit (BBU), a distributed unit (DU), or a road side unit (RSU) having a base station function, that constitutes a gNB or a transmission point.

It may be understood that, in addition to the functional network elements shown in FIG. 3, the network architecture of the 5G network may further include another functional network element, for example, a unified data repository (UDR) or an unstructured data storage function (UDSF). In embodiments of this application, the network element may also be referred to as an entity, a device, or the like.

2. Direct Data Reporting Manner and Indirect Data Reporting Manner

Figure 4:
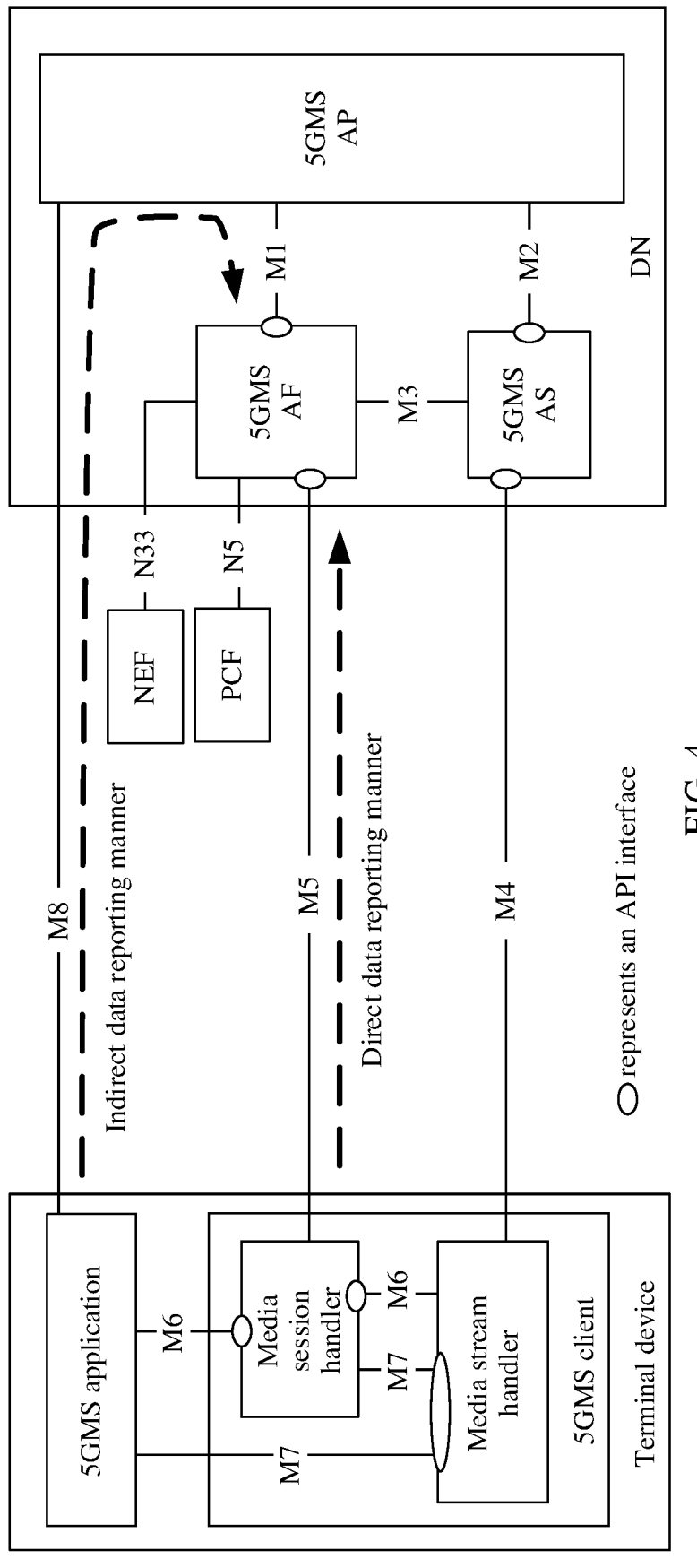
FIG. 4 is a schematic diagram of a data reporting manner according to an embodiment of this application.

FIG. 4 is a schematic diagram of a data reporting manner according to an embodiment of this application.

As shown in FIG. 4, for a direct data reporting manner, after collecting data, a terminal device side directly reports a data result to a (5GMS) AF side through an M5 interface.

For an indirect data reporting manner, the terminal device does not directly send the data result to the (5GMS) AF side, but first sends the data result to a (5GMS) application provider side through a (5GMS) application entity, and then the (5GMS) application provider side sends the data result to the (5GMS) AF side.

An existing 5GMS architecture cannot support the indirect data reporting manner. How to enhance the existing 5GMS architecture and procedure to support the indirect data reporting manner becomes an important problem that needs to be urgently resolved.

According to a communication method provided in this application, the 5GMS architecture and procedure can be enhanced, so that the direct and indirect data reporting manners can be supported. For example, it is ensured, by enhancing a metrics collection configuration generation and distribution process, that a media session handler entity of the terminal device reports the data collection result to the application entity. The application entity sends the data collection result from the media session handler entity to the application provider through an API interface (for example, M6) of the media session handler entity of the terminal device. Finally, it is ensured that the application provider can send the data collection result from the application entity to the 5GMS AF network element, to implement indirect data reporting. Alternatively, for a general data collection architecture, direct or indirect data reporting of the general data collection architecture may be implemented.

The following describes in detail communication methods provided in embodiments of this application with reference to FIG. 5 to FIG. 8.

Figure 5:
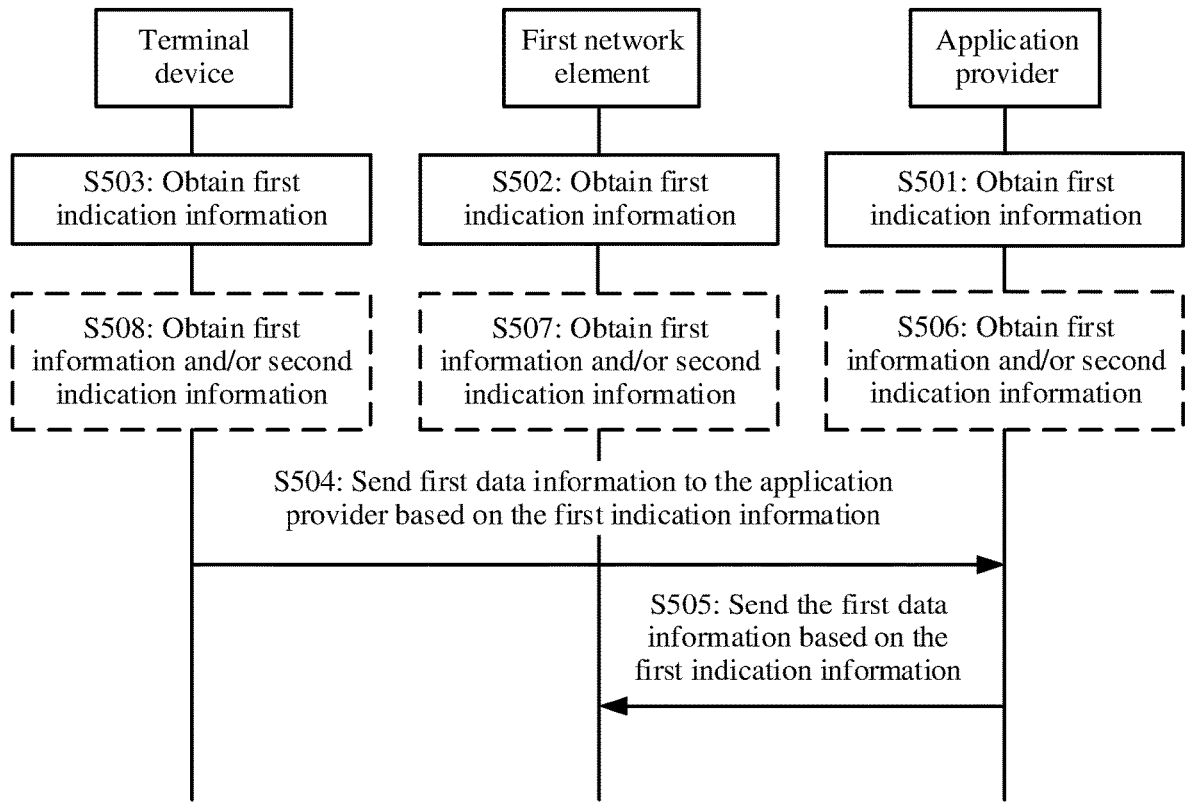
FIG. 5 is a schematic flowchart of a communication method according to an embodiment of this application.

For example, FIG. 5 is a schematic flowchart of a communication method according to an embodiment of this application. The communication method is applicable to communication between any two nodes shown in FIG. 1.

As shown in FIG. 5, the communication method includes the following steps.

S501: An application provider obtains first indication information.

For example, the first indication information indicates that data is transmitted between a terminal device and a first network element via the application provider.

With reference to FIG. 1, the application provider may be the 5GMS AP, and the first network element may be the 5GMS AF network element.

Optionally, the first indication information may indicate to use an indirect data reporting manner.

Optionally, the first indication information may indicate to use a direct data reporting manner. For example, the first indication information may indicate the terminal device to directly (through an M5 interface) transmit the data to the first network element.

It should be noted that the communication method provided in this embodiment of this application is applicable to the direct data reporting manner and the indirect data reporting manner. The indirect data reporting manner is used as an example for description. With reference to FIG. 4, for example, in a downlink communication scenario, the first indication information may indicate that the data is sent by the terminal device to the 5GMS AP through an M8 interface, and then sent by the 5GMS AP to the 5GMS AF network element through an M1 interface.

In this way, the application provider receives the data from the terminal device, and may send the data to the first network element based on indirect data reporting manner indication information, to implement indirect data reporting.

In some embodiments, the first indication information may further include first address information.

Alternatively, in some embodiments, the first indication information may not include first address information. Correspondingly, an action the same as an action performed on the first indication information is performed on the first address information in a same step or different steps. For example, if the method provided in this application includes that the application provider obtains the first indication information, the method may further include that the application provider obtains the first address information, and the two actions may be performed in a same step or different steps. Similarly, if the method provided in this application includes that the first network element obtains the first indication information, the method may further include that the first network element obtains the first address information. Details are not described one by one.

For example, the first address information may indicate to send the data to a first address.

For example, the first address information may include a port address or access identifier information.

Optionally, the first address information and the first address may be changeable. For example, as the data is transmitted, the first address changes.

For example, the first address may be an address of the first network element, an address of the application provider, an address of an application entity of the terminal device, or an address of a media session handler entity of the terminal device.

For example, when the data is sent by a client entity of the terminal device to the application entity of the terminal device, the first address is the address of the application entity of the terminal device. When the data is sent by the application entity of the terminal device to the application provider, the first address is the address of the application provider. When the data is sent by the application provider to the first network element, the first address is the address of the first network element. Optionally, when the data is sent by a media stream handler entity of the terminal device to the media session handler entity of the terminal device, the first address is the address of the media session handler entity of the terminal device.

In a possible design, in S501, that an application provider obtains first indication information may include S501a: The application provider determines the first indication information.

That is, the indirect data reporting manner may be determined by the application provider.

Optionally, if the first indication information includes the first address information, the first address information may be address information of the first network element, so that the application provider may send the received data to the first network element after receiving the data.

In another possible design, in S501, that an application provider obtains first indication information may include S501b: The application provider receives the first indication information from the first network element.

Correspondingly, the first network element sends the first indication information to the application provider.

That is, the indirect data reporting manner is indicated by the first network element.

It should be noted that the first indication information in S501b is similar to that in S501a. If the first indication information includes the first address information, the first address information may be address information of the first network element. Details are not described herein again.

In some embodiments, the application provider may store the first indication information. In this way, after receiving the data from the application entity of the terminal device, the application provider sends the data to the first network element based on the first indication information.

Optionally, the application provider may store the first address information. In this way, after receiving the data from the application entity of the terminal device, the application provider sends the data to the first network element based on the first indication information and the first address information.

Optionally, because the data needs to be transmitted via the application provider and the application entity of the terminal device, the application provider or the application entity of the terminal device may need to provide corresponding information and/or perform corresponding processing, for example, provide application layer user identifier information or perform preliminary processing on the data. This is not specifically limited in this application.

In some embodiments, the communication method provided in this embodiment of this application may further include: The application provider obtains first addition information and/or first processing information.

Optionally, that the application provider obtains first addition information and/or first processing information may include: The application provider determines the first addition information and/or the first processing information.

For example, the first addition information may include information related to transmission of the data via the application provider and the application entity of the terminal device.

For example, the first processing information may indicate a processing action related to transmission of the data via the application provider and the application entity of the terminal device.

Therefore, the application provider may provide the first addition information and/or perform the processing action indicated by the first processing information.

Alternatively, optionally, that the application provider obtains first addition information and/or first processing information may include: The application provider determines the first addition information and/or the first processing information from the first network element.

Correspondingly, the first network element may send the first addition information and/or the first processing information to the application provider.

In this way, the application provider may provide the first addition information or perform a processing action indicated by the first processing information.

In a possible design, the communication method provided in this embodiment of this application may further include S506: The application provider obtains first information and/or second indication information.

Optionally, the first information may be used to determine first data information.

For example, the first information may include information related to a 5GMSd feature.

For example, the first information includes but is not limited to one or more of the following configuration information: network assistance, dynamic policy adjustment, metrics collection and reporting, consumption collection and reporting, and general user-side data collection and reporting.

For example, the first information includes the metrics collection and reporting configuration information. The first information may be but is not limited to one or more of the following: a parameter configuration scheme, a DNN data network name, a reporting interval, a percentage of a reported media session (sample percentage), a media streaming source filter, and a reporting parameter.

The parameter configuration scheme may be associated with a 3GPP or non-3GPP entity. If no parameter configuration scheme is specified, a default 3GPP parameter configuration scheme may be used. The parameter configuration scheme can be uniquely identified by a uniform resource identifier (uniform resource identifier, URI).

The DNN data network name may be a data network name used for sending a metrics collection report. If no DNN data network name is specified, a default DNN data network name is used.

The reporting interval may be a reporting time interval of a metrics collection result. If no reporting interval is defined, reporting may be performed only once after a media service ends.

The percentage of the reported media session may be a percentage of a to-be-reported media streaming session in media streaming sessions. If no reported media session percentage is specified, it may indicate that all the media streaming sessions need to be reported.

The media streaming source filter may be a URL list, and may be used to determine a URL connection for which metrics collection and reporting need to be performed. If no media streaming source filter is specified, it may indicate that all URLs need to be collected and reported.

The reporting parameter may indicate specific parameter information collected and reported in a media streaming service. If no reporting parameter is specified, it may indicate that all or default parameters are collected and reported.

Optionally, the first information may include the first indication information.

For example, configuration information of metrics collection and reporting is used as an example. The application provider obtains the configuration information of metrics collection and reporting and the first indication information in a same step.

Optionally, the first information may further include the first addition information and/or the first processing information.

It should be noted that S506, S501, and that the application provider obtains first addition information and/or first processing information may be performed in a same step, or may be partially performed in a same step, or may be separately performed. This is not limited in this application.

Optionally, the second indication information may indicate the first information. In this way, the first information may be obtained based on the second indication information.

In a possible design, the communication method provided in this embodiment of this application may further include S506a: The application provider determines second information.

Optionally, the second information may be used to determine the first information.

For example, the application provider may send the second information to the first network element, and the first network element determines the first information based on the second information. Refer to the following S507a and S507b.

For example, the second information may include the information related to the 5GMSd feature.

For example, the second information includes but is not limited to one or more of the following configuration information: network assistance, dynamic policy adjustment, metrics collection and reporting, consumption collection and reporting, and general user-side data collection and reporting.

For example, the second information includes the metrics collection and reporting configuration information. The second information may be but is not limited to one or more of the following: a parameter configuration scheme, a DNN data network name, a reporting interval, a percentage of a reported media session (sample percentage), a media streaming source filter, and a reporting parameter.

Optionally, the second information may include the first indication information.

Optionally, the second information may further include the first addition information and/or the first processing information.

In a possible design, in S506, that the application provider obtains first information and/or second indication information may include S506b: The application provider receives the first information and/or the second indication information from the first network element.

Correspondingly, the first network element sends the first information and/or the second indication information to the application provider.

In other words, the first information and/or the second indication information are/is indicated by the first network element.

For example, the first network element may send the address information of the 5GMS AS to the application provider.

It is assumed that the first data information is a downlink media streaming service. In this case, the application provider may inject the downlink media streaming service into the 5GMS AS network element based on the address information of the 5GMS AS network element.

S502: The first network element obtains the first indication information.

In this way, the first network element obtains the first indication information, and may receive the data from the application provider in the indirect data reporting manner.

In a possible design, in S502, that the first network element obtains the first indication information may include S502a: The first network element receives the first indication information from the application provider.

Correspondingly, the application provider sends the first indication information to the first network element.

In other words, the first indication information may be indicated by the application provider to the first network element.

In another possible design, in S502, that the first network element obtains the first indication information may include S502b: The first network element determines the first indication information.

That is, the indirect data reporting manner may be determined by the first network element.

For example, the first network element may determine, based on some local reasons, for example, the direct reporting manner is unavailable, to use the indirect data reporting manner.

In some embodiments, the communication method provided in this embodiment of this application may further include: The first network element obtains the first addition information and/or the first processing information.

Optionally, that the first network element obtains the first addition information and/or the first processing information may include: The first network element determines the first addition information and/or the first processing information.

Alternatively, optionally, that the first network element obtains the first addition information and/or the first processing information may include: The first network element receives the first addition information and/or the first processing information from the application provider.

Correspondingly, the application provider may send the first addition information and/or the first processing information to the first network element.

In a possible design, the communication method provided in this embodiment of this application may further include S507: The first network element obtains the first information and/or the second indication information.

For specific implementations of the first information and the second indication information, refer to step S506. Details are not described herein again.

It should be noted that, S507, S502, and that the first network element obtains first addition information and/or first processing information may be performed in a same step, or may be partially performed in a same step, or may be separately performed. This is not limited in this primacy In a possible design, in S507, that the first network element obtains the first information and/or the second indication information includes S507a: The first network element determines the first information and/or the second indication information.

In other words, the first information and/or the second indication information may be determined by the first network element. For example, the first network element may generate both the first information and the second indication information.

Optionally, the first network element may determine the first information and/or the second indication information based on the first indication information.

For example, the first network element determines the first information and/or the second indication information based on an indirect data transmission manner.

Optionally, the first network element may determine the first information and/or the second indication information based on the second information.

For example, the first network element may determine the first information and/or the second indication information based on the information related to the 5GMSd feature and the like.

Optionally, the first network element may determine the first information and/or the second indication information based on the second information and the first indication information.

For example, the first network element may determine the first information and/or the second indication information based on the indirect data transmission manner, the information related to the 5GMSd feature, and the like.

For example, the first network element may compile the second information into the first information (for example, SAI configuration information), to further obtain the second indication information (for example, SAI index information).

In a possible design, that the first network element obtains the first information and/or the second indication information may further include S507b: The first network element receives the second information from the application provider.

Correspondingly, the application provider sends the second information to the first network element.

In a possible design, the communication method provided in this embodiment of this application may further include: The first network element performs resource configuration on a second network element based on the second information.

For example, the second network element may be the 5GMS AS network element.

For example, an M4 interface and an M2 interface are configured for ingesting and distributing media stream data.

S503: The terminal device obtains the first indication information.

In a possible design, in S503, that the terminal device obtains the first indication information may include S503a: The terminal device receives the first indication information from the application provider.

Correspondingly, the application provider sends the first indication information to the terminal device.

In this way, the terminal device may send the data to the application provider based on the indirect data reporting manner indication information.

Optionally, if the first indication information includes the first address information, the first address information may be address information of the application provider, so that the terminal device may send the data to the application provider.

Optionally, the application provider may send the first indication information to the application entity of the terminal device. Correspondingly, the application entity of the terminal device receives the first indication information from the application provider.

In this way, the application entity of the terminal device may receive the data from the client entity of the terminal device, and forward the data to the application provider.

For example, the application entity of the terminal device may store the first address information, and replace the first address information with the application entity of the terminal device, to send the first address information to the media session handler entity or the client entity of the terminal device.

In another possible design, in S503, that the terminal device obtains the first indication information includes S503b: The terminal device receives the first indication information from the first network element.

Correspondingly, the first network element sends the first indication information to the terminal device.

In this way, the terminal device may send the data to the application provider based on the indirect data reporting manner indication information.

Optionally, the first network element may send the first indication information to the media session handler entity of the terminal device. Correspondingly, the media session handler entity of the terminal device receives the first indication information from the first network element.

Optionally, the first indication information from the first network element may be in the first information.

With reference to FIG. 4, the first network element may send the first indication information to the media session handler entity of the terminal device through the M5 interface.

Optionally, if the first indication information includes the first address information, the first address information may be address information of the application entity of the terminal device, so that the media session handler entity of the terminal device may send the data to the application entity of the terminal device.

For example, the media session handler entity of the terminal device may store the first address information, and replace the first address information with the address information of the application provider, to send the first address information to the application entity of the terminal device.

Optionally, if the first indication information includes the first address information, the first address information may be the address information of the application provider, so that the media session handler entity of the terminal device may provide the address information of the application provider for the application entity of the terminal device, and the media session handler entity sends the first data information to the application entity based on the first indication information.

For example, the media session handler entity of the terminal device may send the first address information to the application entity of the terminal device, and send the first data information to the application entity at the same time.

In some embodiments, the communication method provided in this embodiment of this application may further include: The terminal device obtains the first addition information and/or the first processing information.

Optionally, that the terminal device obtains the first addition information and/or the first processing information may include: The terminal device receives the first addition information and/or the first processing information from the application provider.

Correspondingly, the application provider sends the first addition information and/or the first processing information to the terminal device.

Optionally, the application provider may send the first addition information and/or the first processing information to an application entity of the terminal device. Correspondingly, the application entity of the terminal device receives the first addition information and/or the first processing information from the application provider.

In this way, the terminal device can add the information related to transmission of the data via the application provider and the application entity of the terminal device, and perform the related processing action.

Alternatively, optionally, that the terminal device obtains the first addition information and/or the first processing information may include: The first network element receives the first addition information and/or the first processing information from the primacy.

Correspondingly, the first network element sends the first addition information and/or the first processing information to the terminal device.

Optionally, the first network element may send the first addition information and/or the first processing information to the media session handler entity of the terminal device. Correspondingly, the media session handler entity of the terminal device receives the first addition information and/or the first processing information from the first network element.

Optionally, the first addition information and/or the first processing information from the first network element may be in the first information.

In a possible design, the communication method provided in this embodiment of this application may further include S508: The terminal device obtains the first information and/or the second indication information.

For specific implementations of the first information and the second indication information, refer to step S506. Details are not described herein again.

It should be noted that, S508, S503, and that the terminal device obtains first addition information and/or first processing information may be performed in a same step, or may be partially performed in a same step, or may be separately performed. This is not limited in this application.

In a possible design, in S508, that the terminal device obtains the first information and/or the second indication information may include S508a: The first network element receives the first information and/or the second indication information from the application provider.

Correspondingly, the application provider sends the first information and/or the second indication information to the terminal device.

Optionally, the application provider may send the first information and/or the second indication information to the application entity of the terminal device. Correspondingly, the application entity of the terminal device receives the first information and/or the second indication information from the application provider.

In another possible design, in S508, that the terminal device obtains the first information and/or the second indication information may include S508b: The first network element receives the first information and/or the second indication information from the first network element.

Optionally, the first network element may send the first information and/or the second indication information to the media session handler entity of the terminal device. Correspondingly, the media session handler entity of the terminal device receives the first information and/or the second indication information from the first network element.

Optionally, when the application provider sends information such as the first indication information, the first address information, the first addition information, the first processing information, the first information, and/or the second instruction information to the terminal device, the information may be sent by using a same step, or may be partially sent by using a same step, or may be separately sent. This is not limited in this application. A case in which the first network element sends information such as the first indication information, the first address information, the first addition information, the first processing information, the first information, and/or the second indication information to the terminal device is similar. Details are not described again.

For example, the first indication information and the first information are sent at the same time. The application provider may send the first indication information and the first information to the terminal device by using a service announcement (service announcement) message.

For example, the service announcement message may include the first indication information and the first information. The first information may include the information related to the 5GMSd feature and the first indication information.

That is, the application provider may send, to the terminal device by using the service announcement message, the first indication information and the first information that includes the information related to the 5GMSd feature.

Optionally, the first indication information may indicate the application entity of the terminal device to parse the first information and configure the media session handler entity of the terminal device.

Therefore, the terminal device may obtain a data transmission manner by using the first indication information, and may obtain the information related to the 5GMSd feature and the data transmission manner by parsing the first information.

In some embodiments, after the application entity of the terminal device receives the first indication information, the first address information, the first addition information, the first processing information, and the first information and/or the second indication information from the application provider, the communication method provided in this embodiment of this application may further include the following step a.

Step a: The application entity of the terminal device sends the first indication information, the first address information, the first addition information and/or the first processing information, and the first information and/or the second indication information to the client entity of the terminal device. Correspondingly, the client entity of the terminal device receives the first indication information, the first address information, the first addition information and/or the first processing information, and the first information and/or the second indication information from the application entity of the terminal device.

Optionally, if the first indication information includes the first address information, the first address information is the address information of the application entity of the terminal device or the address of the application provider.

In this way, the client entity of the terminal device may send the data to the application entity of the terminal device based on the first indication information.

In some embodiments, after the application entity of the terminal device receives the first indication information, the first address information, the first addition information, the first processing information, and the first information and/or the second indication information from the application provider, the communication method provided in this embodiment of this application may further include the following step b.

Step b: The application entity of the terminal device sends the first indication information, the first address information, the first addition information and/or the first processing information, and first information and/or the second indication information to the media session handler entity of the client entity of the terminal device. Correspondingly, the media session handler entity of the client entity of the terminal device receives the first indication information, the first address information, the first addition information and/or the first processing information, and the first information and/or the second indication information from the application entity of the terminal device.

Optionally, similar to step a, if the first indication information includes the first address information, the first address information is the address information of the application entity of the terminal device or the address information of the application provider.

In this way, the media session handler entity of the terminal device may send the data to the application entity of the terminal device based on the first indication information.

In some embodiments, after the media session handler entity of the terminal device receives the first indication information, the first address information, the first addition information and/or the first processing information, and the first information and/or the second indication information from the first network element, the communication method provided in this embodiment of this application may further include the following step c.

Step c: The media session handler entity of the terminal device may send the first indication information, the first address information, the first addition information and/or the first processing information, and the first information and/or the second indication information to the application entity of the terminal device. Correspondingly, the application entity of the terminal device receives the first indication information, the first address information, the first addition information and/or the first processing information, and the first information and/or the second indication information from the media session handler entity of the terminal device.

Optionally, the first address information may be the address information of the application provider. The first address information may be address information of the media session handler entity of the terminal device after replacement.

In this way, after receiving the data from the media session handler entity of the terminal device, the application entity of the terminal device may send the data to the application provider.

In a possible design, the communication method provided in this embodiment of this application may further include the following step d. Step d: The media session handler entity of the terminal device obtains the first information from the first network element based on the second indication information.

It should be noted that a sequence of S501 to S503 is not limited in this embodiment of this application, a sequence of S506 to S508 is not limited, and a sequence of step a to step d is not limited.

S504: The terminal device sends the first data information to the application provider based on the first indication information. Correspondingly, the application provider receives the first data information from the terminal device.

In this way, the terminal device sends the first data information to the application provider based on the indirect data reporting manner indication information.

In a possible design, S504 may include S504a: The application entity of the terminal device sends the first data information to the application provider based on the first indication information. Correspondingly, the application provider receives the first data information from the application entity of the terminal device.

Optionally, if the first indication information includes first address information, the first address information is the address information of the application provider, and the first address is the address of the application provider.

In some embodiments, the communication method provided in this embodiment of this application may further include step e: The application entity of the terminal device may add other information to the first data information based on the first addition information, and/or perform, based on the first processing information, the processing action indicated by the first processing information.

For example, with reference to FIG. 4, the 5GMS application entity of the terminal device sends the first data information to the 5GMS AP through the M8 interface.

In a possible design, the communication method provided in this embodiment of this application may further include step f: The client entity of the terminal device sends the first data information to the application entity of the terminal device based on the first indication information. Correspondingly, the application entity of the terminal device receives the first data information from the client entity of the terminal device.

Optionally, if the first indication information includes first address information, the first address information is the address information of the application entity of the terminal device, and the first address is the address of the application entity of the terminal device.

Optionally, if the first indication information includes first address information, the first address information is the address information of the application provider, and the first address is the address of the application provider.

In another possible design, the communication method provided in this embodiment of this application may further include step g: The media session handler entity of the client entity of the terminal device sends the first data information to the application entity of the terminal device based on the first indication information. Correspondingly, the application entity of the terminal device receives the first data information from the media session handler entity of the client entity of the terminal device.

For a specific implementation of the first indication information, refer to step f. Details are not described herein again.

For example, the media session handler entity of the terminal device periodically sends the first data information to the application entity. For example, the first data information may be periodically sent to the application entity in a form of a hypertext transfer protocol (HTTP) notification.

That is, the application entity of the terminal device may receive the first data information from the client entity or the media session handler entity.

In some embodiments, the first data information is determined by the terminal device based on the first information.

For example, the first information includes the configuration information of metrics collection and reporting, and the first data information may include the metrics collection result.

In a possible design, the communication method provided in this embodiment of this application may further include step h: The client entity of the terminal device determines the first data information based on the first information.

In a possible design, the communication method provided in this embodiment of this application may further include the following step i and step j.

Step i: A media player entity of the client entity of the terminal device determines the first data information based on the first information.

Step j: The media player entity of the terminal device sends the first data information to the media session handler entity of the terminal device. Correspondingly, the media session handler entity of the terminal device receives the first data information from the media player entity of the terminal device.

For example, when a specified time interval or a timer expires, the media player entity of the terminal device sends the first data information to the media session handler entity.

Optionally, before step i, the communication method provided in this embodiment of this application may further include: step L: The media session handler entity of the terminal device configures the media player entity of the terminal device based on the first information, to determine the first data information.

For example, the media session handler entity of the terminal device configures, based on the configuration information of metrics collection and reporting, the media player entity to perform metrics collection and reporting.

S505: The application provider sends the first data information to the first network element based on the first indication information. Correspondingly, the first network element receives the first data information from the application provider based on the first indication information.

In some embodiments, the communication method provided in this embodiment of this application may further include step m: The application provider may add other information to the first data information based on the first add information, and/or perform, based on the first processing information, the processing action that the first processing information indicates the application provider to perform.

Optionally, step m may be performed before S505.

In some embodiments, the communication method provided in this embodiment of this application may further include the following step n to step p.

Step n: The application provider and a 5GS complete negotiation of a service level agreement (service level agreement, SLA), or the application provider determines a service policy.

For example, a network service may be ensured by using the service level agreement.

For example, a delay and bandwidth may be approximately ensured by using the service level agreement.

Step o: The application provider may perform mutual authentication with the first network element.

In this way, it can be ensured that the first network element is a legal entity that can perform service provisioning.

Step p: The application provider creates a service provisioning session.

For example, the application provider creates the service provisioning session for an uplink/downlink media streaming service, and sends, to the first network element, configuration information used for transmission and distribution of the media streaming service.

It should be noted that an alphabetical order (a to p) of the steps in this embodiment of this application does not limit an execution sequence of the steps.

According to the communication method shown in FIG. 5, the application provider receives first the data information from the terminal device, and the application provider sends the first data information to the first network element based on the first indication information. The first indication information may indicate that the data is transmitted between the terminal device and the first network element via the application provider. In this way, the terminal device can indirectly send the data to the first network element via the application provider, to implement indirect data reporting.

Figure 6A:
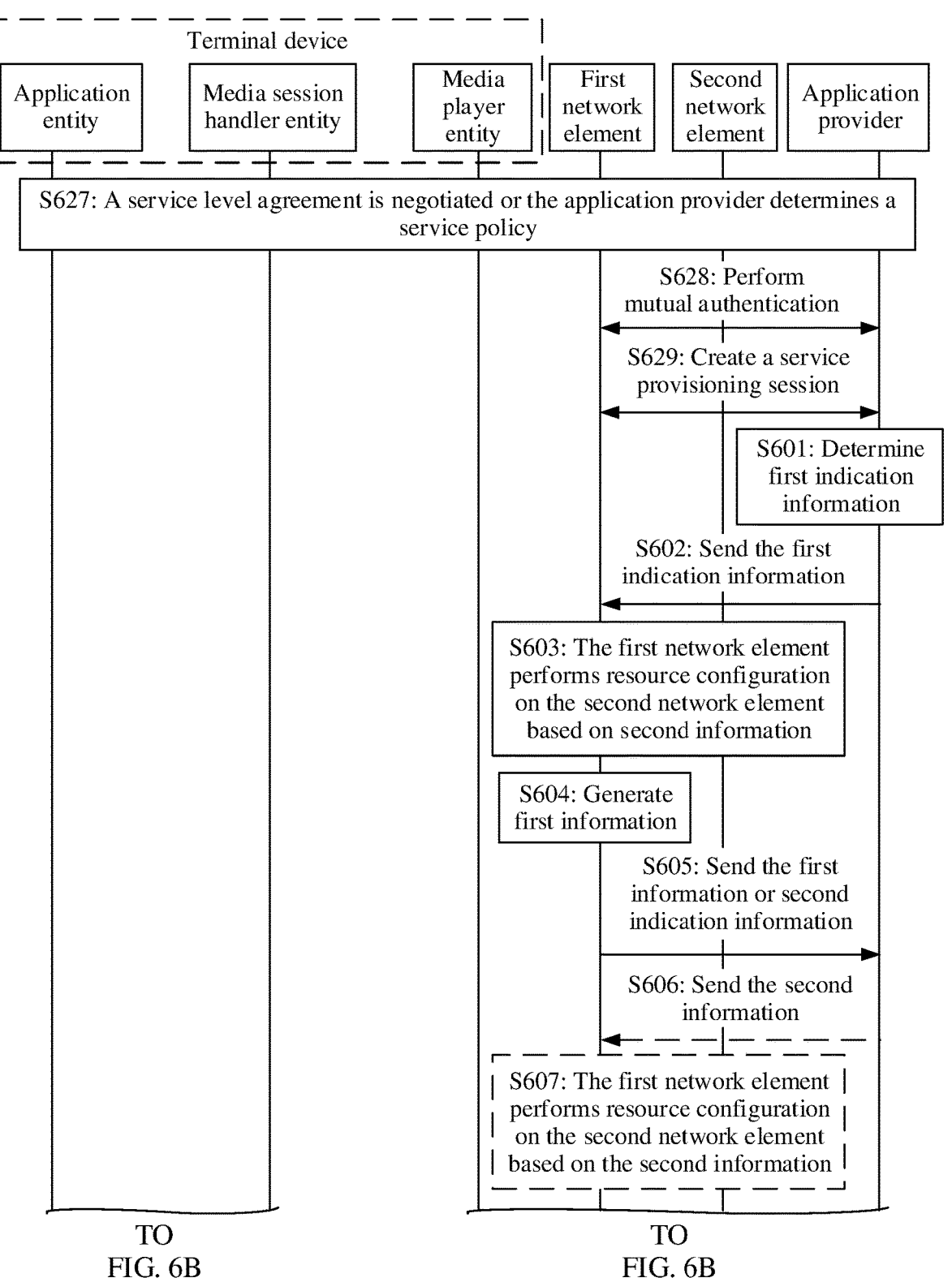
FIG. 6A to FIG. 6C are a schematic flowchart of another communication method according to an embodiment of this application.
Figure 6B:
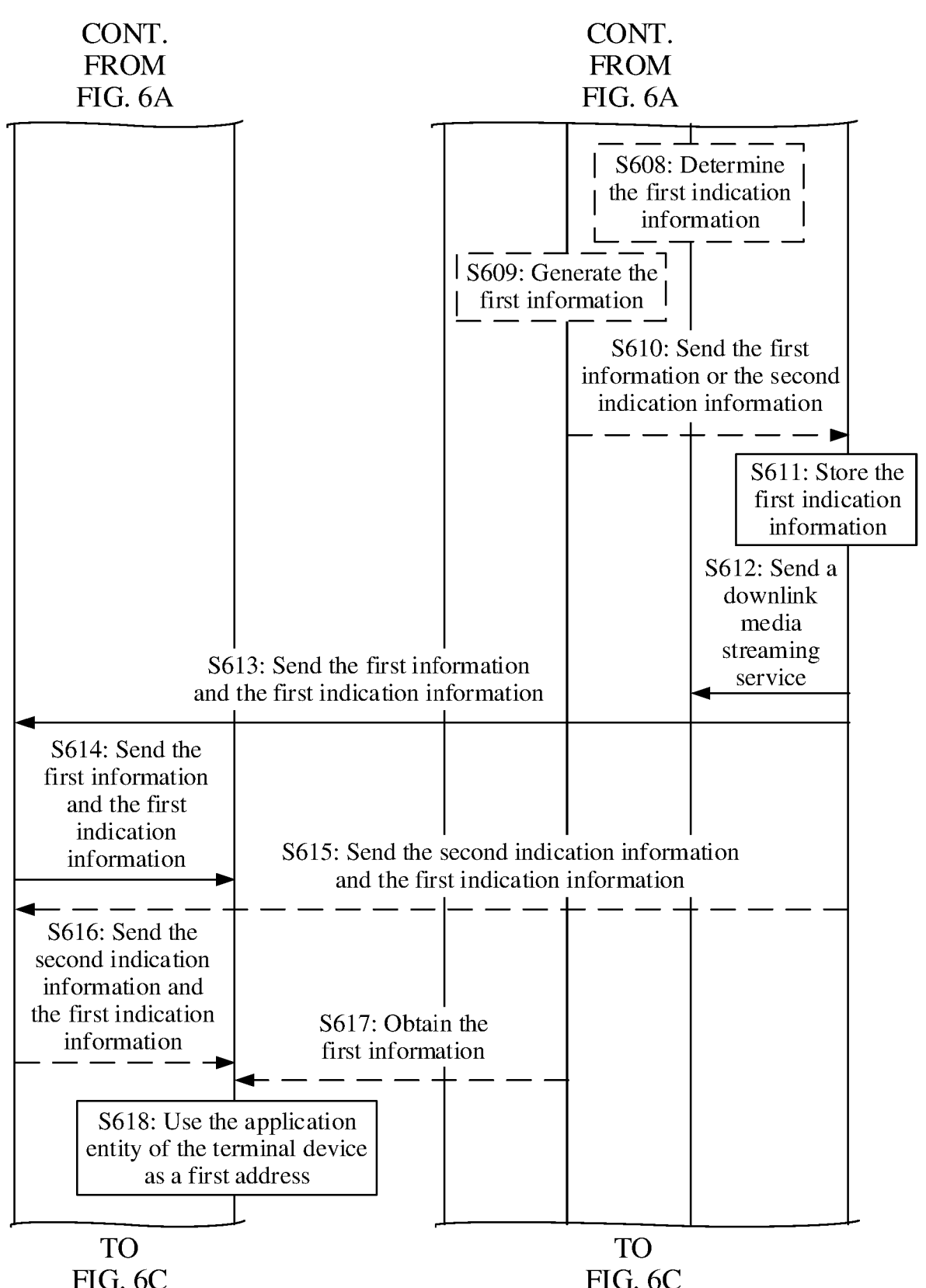
Figure 6C:
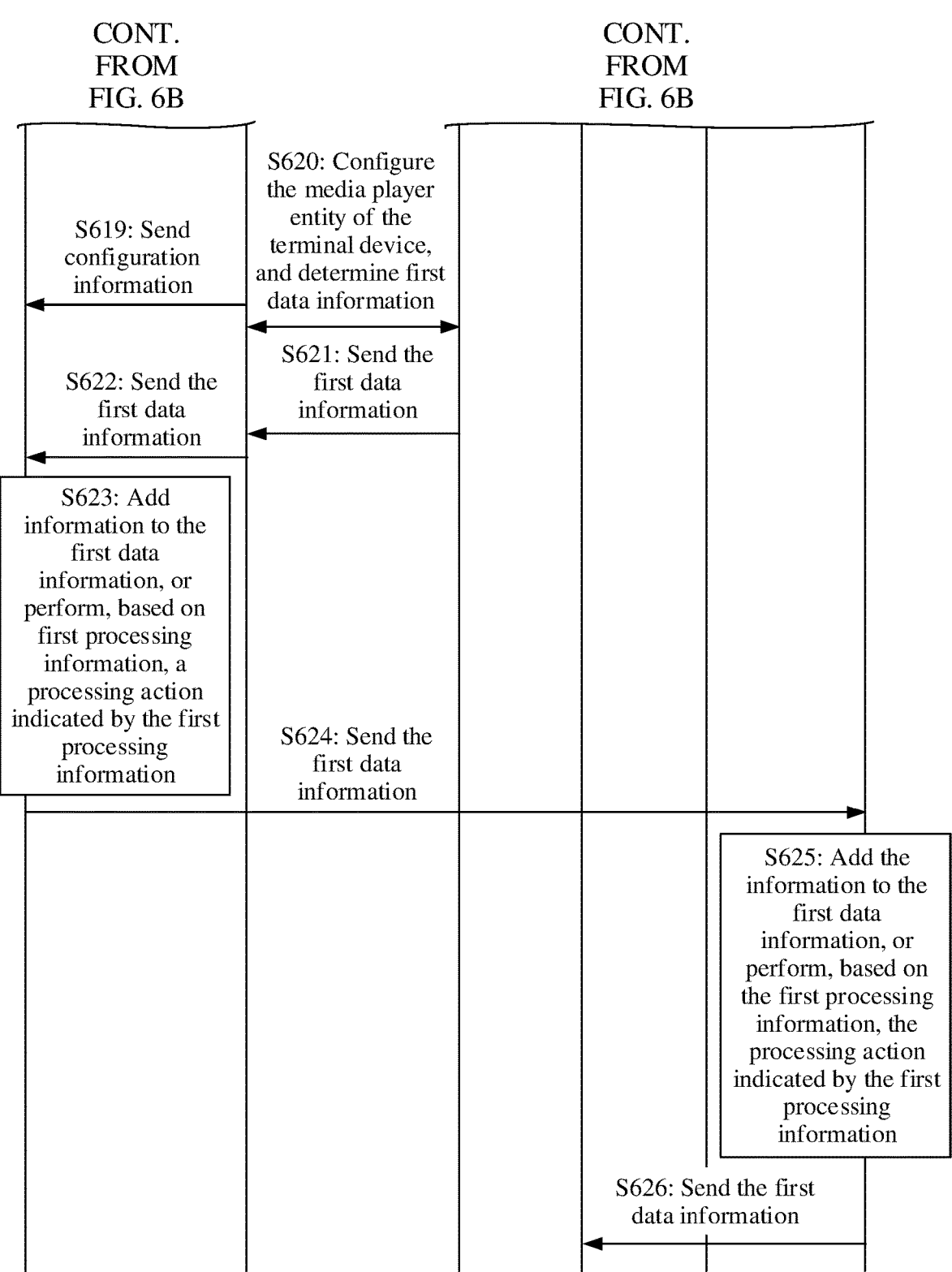

For example, FIG. 6A to FIG. 6C are a schematic flowchart of another communication method according to an embodiment of this application. The communication method is applicable to communication between any two nodes shown in FIG. 1. In FIG. 6A to FIG. 6C, an example in which a first network element or an application provider obtains first indication information and first information, sends the first information to a media session handler entity of a terminal device through an M8 or M5 interface, and the media session handler entity of the terminal device parses the first information and configures an application layer is used for description.

As shown in FIG. 6A to FIG. 6C, the communication method includes the following steps.

In the following, S601 to S605 are parallel to S601 to S610. For example, in S601 to S605, the application provider determines the first indication information, and in S606 to S610, the first network element determines the first indication information.

S601: The application provider determines the first indication information.

For a specific implementation of the first indication information, refer to S501 and S501a. Details are not described herein again.

For a specific implementation of S601, refer to S501a. Details are not described herein again.

Optionally, the communication method provided in this embodiment of this application may further include: The application provider determines second information. A specific implementation is the same as that in S506a. Details are not described herein again.

For a specific implementation of the second information, refer to S506 and S506a. Details are not described herein again.

Optionally, the communication method provided in this embodiment of this application may further include: The application provider determines first addition information and/or first processing information. For a specific implementation, refer to the corresponding implementation in S501. Details are not described herein again.

S602: The application provider sends the first indication information to the first network element. Correspondingly, the first network element receives the first indication information from the application provider.

For a specific implementation of S602, refer to S502a. Details are not described herein again.

Optionally, the communication method provided in this embodiment of this application may further include: The application provider sends the second information to the first network element. Correspondingly, the first network element receives the second information from the application provider. For a specific implementation, refer to the corresponding implementation in S507b. Details are not described herein again.

Optionally, the communication method provided in this embodiment of this application may further include: The application provider sends the first addition information and/or the first processing information to the first network element. Correspondingly, the first network element receives the first addition information and/or the first processing information from the application provider. For a specific implementation, refer to the corresponding implementation in S502. Details are not described herein again.

S603: The first network element may perform resource configuration on a second network element based on the second information.

For a specific implementation of S603, refer to the corresponding implementation in S502. Details are not described herein again.

S603 may be an optional step.

S604: The first network element generates the first information based on the second information.

The first information generated in step S604 may not only include information related to a 5GMSd feature, but may further include the first indication information, first address information, and the first addition information and/or the first processing information.

Optionally, the first network element may further generate second indication information.

S605: The first network element sends the first information or the second indication information to the application provider. Correspondingly, the application provider receives the first information or the second indication information from the first network element.

Optionally, the first network element may further send address information of the second network element to the application provider.

For example, the second network element may be a 5GMS AS network element.

For example, in S606 to S610, the first network element determines the first indication information.

S606: The application provider sends the second information to the first network element. Correspondingly, the first network element receives the second information from the application provider. For a specific implementation, refer to the corresponding implementation in S507b. Details are not described herein again.

S606 may be an optional step.

S607 is the same as S603. Details are not described herein again. S607 may be an optional step.

S608: The first network element determines the first indication information.

For a specific implementation of S608, refer to S502b. Details are not described herein again.

Optionally, the communication method provided in this embodiment of this application may further include: The first network element determines the first information and/or the second indication information. For a specific implementation, refer to the corresponding implementation in S507a. Details are not described herein again.

Optionally, the communication method provided in this embodiment of this application may further include: The first network element determines the first addition information and/or the first processing information.

S609 is the same as S604. Details are not described herein again.

S610: The first network element sends the first information or the second indication information to the application provider. Correspondingly, the application provider receives the first information or the first indication information from the first network element.

Optionally, the first network element may further send the first indication information to the application provider. In this way, a data transmission manner may be obtained by using the first indication information, without parsing the first information.

Optionally, the first network element may further send the address information of the second network element to the application provider.

For example, the second network element may be the 5GMS AS network element.

S611: The application provider stores the first indication information.

S611 may be an optional step.

S611 inherits S605 or S610. Regardless of whether the application provider or a 5GMS AF determines to use an indirect data reporting manner, the application provider may store indirect data reporting indication information, and send the first data information to the first network element after receiving first data information from an application entity of the terminal device.

S612: The application provider may send a downlink media streaming service to the second network element based on the address information of the second network element. Correspondingly, the second network element receives the downlink media streaming service from the application provider.

For example, the application provider may inject the downlink media streaming service into the 5GMS AS network element based on address information of the 5GMS AS network element.

Optionally, the application provider may send general data to the second network element based on the address information of the second network element.

S612 may be an optional step.

S613 and S614 are described below by using an example in which the first network element sends the first information to the application provider in S605 or S610.

S613: The application provider sends the first information and the first indication information to the application entity of the terminal device. Correspondingly, the application entity of the terminal device receives the first information and the first indication information from the application provider.

Optionally, the application provider may send the first information and the first indication information to the terminal device by using a service announcement message.

For example, the application entity of the terminal device may obtain the data transmission manner by using the first indication information.

Optionally, the first indication information may indicate the application entity to receive configuration information (information obtained by the media session handler entity by parsing the first information) from the media session handler entity.

S614: The application entity of the terminal device sends the first information and the first indication information to the media session handler entity of the terminal device. Correspondingly, the media session handler entity of the terminal device receives the first information and the first indication information from the application entity of the terminal device.

For a specific implementation, refer to the corresponding implementation in step b. Details are not described herein again.

Optionally, the first indication information may indicate the media session handler entity of the terminal device to send the configuration information (the information obtained by the media session handler entity by parsing the first information) to the application entity.

S615 to S617 are described by using an example in which the first network element sends the second indication information to the application provider in S605 or S610.

S615: The application provider sends the second indication information and the first indication information to the application entity of the terminal device. Correspondingly, the application entity of the terminal device receives the second indication information and the first indication information from the application provider.

For a specific implementation, refer to the corresponding implementation in S503. Details are not described herein again.

S616: The application entity of the terminal device sends the second indication information and the first indication information to the media session handler entity of the terminal device. Correspondingly, the media session handler entity of the terminal device receives the second indication information and the first indication information from the application entity of the terminal device.

For a specific implementation, refer to the corresponding implementation in step b. Details are not described herein again.

Optionally, the first indication information may indicate the media session handler entity of the terminal device to send the configuration information (the information obtained by the media session handler entity by parsing the first information) to the application entity.

S617: The media session handler entity of the terminal device obtains the first information from the first network element based on the second indication information.

For example, the obtained first information may include first indication information, the first address information, and the first addition information and/or the first processing information.

Based on S614 or S617, the communication method provided in this embodiment of this application may further include S618 to S626.

S618: The media session handler entity of the terminal device uses the application entity of the terminal device as a first address.

For example, after obtaining the first indication information (or obtaining the first address information), the media session handler entity of the terminal device learns that an indirect data transmission manner is used, and may use the application entity of the terminal device as an address for sending data.

For example, the media session handler entity of the terminal device may obtain the data transmission manner by using the first indication information, or may obtain metrics collection and reporting configuration and the data transmission manner by parsing the first information.

S619: The media session handler entity of the terminal device sends configuration information to the application entity of the terminal device. Correspondingly, the application entity of the terminal device receives the configuration information from the media session handler entity of the terminal device.

For example, the media session handler entity of the terminal device parses the first information. For a specific implementation of the first information, refer to S506. The obtained configuration information may include but is not limited to one or more of the following: configuration information such as network assistance, dynamic policy adjustment, metrics collection and reporting, consumption collection and reporting, and general user-side data collection and reporting, the first addition information, the first processing information, the first indication information, and the first address information.

In a possible design, the communication method provided in this embodiment of this application may further include: The media session handler entity of the terminal device sends the first addition information and/or the first processing information to the application entity of the terminal device.

That is, after parsing the first information, the media session handler entity of the terminal device may send the obtained configuration information to the application entity of the terminal device.

S620: The media session handler entity of the terminal device configures a media player entity of the terminal device based on the first information, and determines the first data information.

S620 is the same as step L. Details are not described herein again.

S621: The media player entity of the terminal device sends the first data information to the media session handler entity of the terminal device. Correspondingly, the media session handler entity of the terminal device receives the first data information from the media player entity of the terminal device.

S621 is the same as step j. Details are not described herein again.

S622: The media session handler entity of the terminal device sends the first data information to the application entity of the terminal device based on the first indication information. Correspondingly, the application entity of the terminal device receives the first data information from the media session handler entity of the client entity of the terminal device.

S622 is the same as step g. Details are not described herein again.

S623: The application entity of the terminal device may add information to the first data information based on the first addition information, and/or perform, based on the first processing information, a processing action indicated by the first processing information.

S623 is the same as step e. Details are not described herein again.

S623 may be an optional step. It should be noted that a step that is not indicated as an optional step in embodiments of this application may also be optional, so that indirect or direct data transmission can be implemented.

S624: The application entity of the terminal device sends the first data information to the application provider based on the first indication information. Correspondingly, the application provider receives the first data information from the application entity of the terminal device.

S624 is the same as S504a. Details are not described herein again.

S625: The application provider may add the information to the first data information based on the first addition information, and/or perform, based on the first processing information, the processing action indicated by the first processing information.

S625 may be an optional step.

S626: The application provider sends the first data information to the first network element based on the first indication information. Correspondingly, the first network element receives the first data information from the application provider based on the first indication information.

In some embodiments, the communication method provided in this embodiment of this application may further include S627 to S629. S627 to S629 are respectively the same as step n to step p. Details are not described herein again.

According to the communication method shown in FIG. 6A to FIG. 6C, the application provider or the first network element determines the data transmission manner. The media player entity of the terminal device obtains the first data information, sends the first data information to the media session handler entity in the indirect data transmission manner, and then sends the first data information to the application entity. The application entity sends the first data information to the application provider, and the application provider sends the first data information to the first network element. In this way, indirect data reporting can be completed.

Figure 7A:
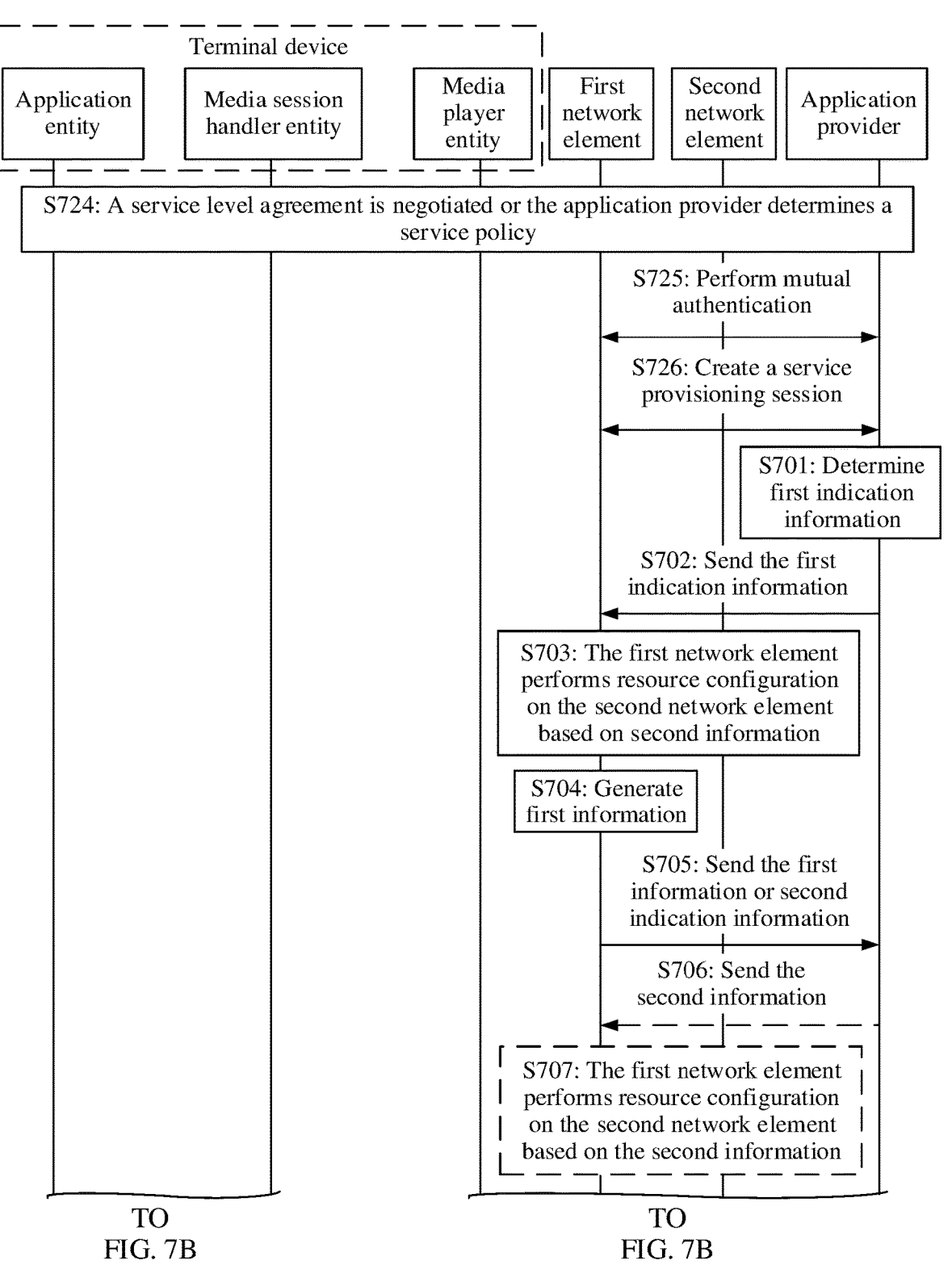
FIG. 7A to FIG. 7C are a schematic flowchart of still another communication method according to an embodiment of this application.
Figure 7B:
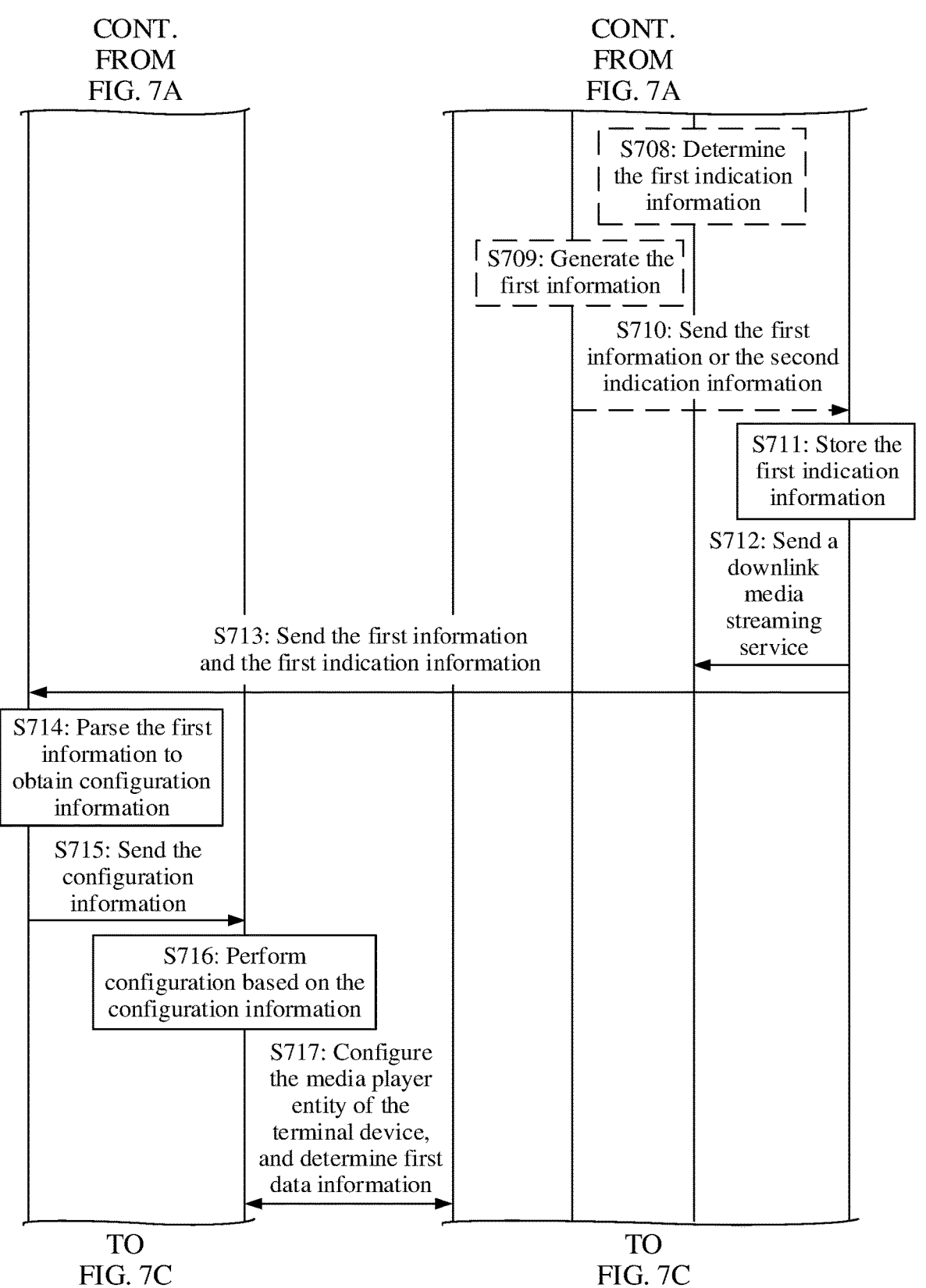
Figure 7C:
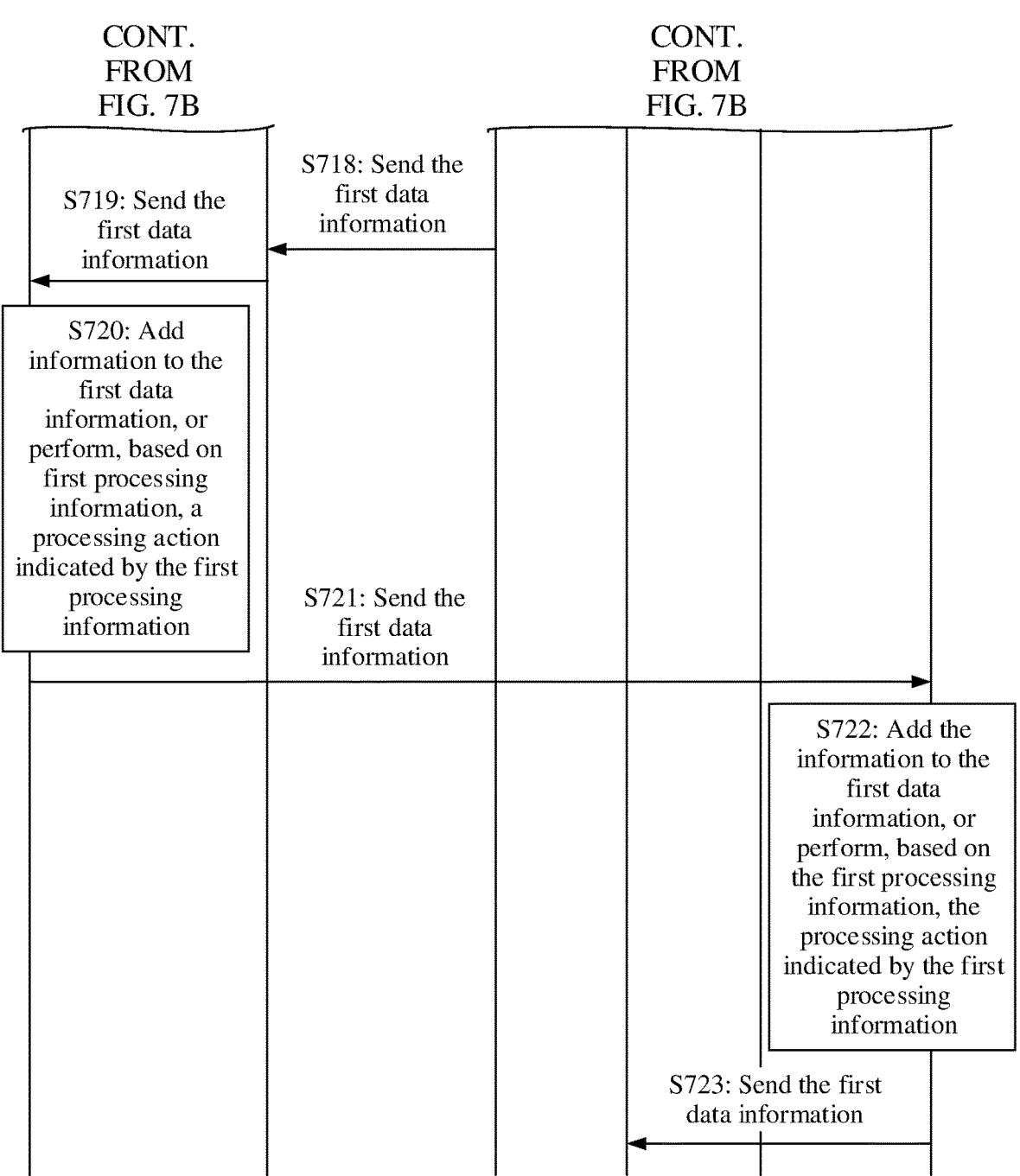

For example, FIG. 7A to FIG. 7C are a schematic flowchart of another communication method according to an embodiment of this application. The communication method is applicable to communication between any two nodes shown in FIG. 1. In FIG. 7A to FIG. 7C, an example in which a first network element or an application provider obtains first indication information and first information, sends the first information to an application entity of a terminal device through an M8 interface, and the application entity of the terminal device parses the first information and configures a media session handler entity is used for description.

As shown in FIG. 7A to FIG. 7C, the communication method includes the following steps.

S701 to S705 are parallel to S706 to S710. For example, in S701 to S705, the application provider determines the first indication information, and in S706 to S710, the first network element determines the first indication information. S701 to S705 are respectively the same as S601 to S605, and S706 to S710 are respectively the same as S606 to S610. Details are not described herein again.

S711 and S712 are respectively the same as S611 and S612. Details are not described herein again.

S713: The application provider sends the first information and the first indication information to the application entity of the terminal device. Correspondingly, the application entity of the terminal device receives the first information and the first indication information from the application provider.

Optionally, the application provider may send the first information and the first indication information to the terminal device by using a service announcement message.

Optionally, the first indication information may indicate the application entity of the terminal device to parse the first information and send obtained configuration information (information obtained by the application entity by parsing the first information) to the media session handler entity.

S714: The application entity of the terminal device parses the first information to obtain the configuration information.

For example, the application entity of the terminal device parses the first information. For a specific implementation of the first information, refer to S506. The obtained configuration information may include but is not limited to one or more of the following: configuration information such as network assistance, dynamic policy adjustment, metrics collection and reporting, consumption collection and reporting, and general user-side data collection and reporting, first addition information, first processing information, the first indication information, and first address information.

Optionally, the application entity of the terminal device may store the first address information, and replace the first address information with the application entity of the terminal device, to send the replaced first address information to the media session handler entity of the terminal device.

Optionally, the application entity of the terminal device may record the first addition information and the first processing information, to report the first addition information or perform a processing action indicated by first data information in a subsequent process of reporting the first data information.

S715: The application entity of the terminal device sends the configuration information to the media session handler entity of the terminal device. Correspondingly, the media session handler entity of the terminal device receives the configuration information from the application entity of the terminal device.

In this way, the application entity of the terminal device can parse the first information, and configure the obtained configuration information for the media session handler entity of the terminal device.

S716: The media session handler entity of the terminal device performs configuration based on the configuration information.

For example, the media session handler entity of the terminal device configures an indirect data collection and reporting manner based on the configuration information. For details, refer to S620 and S621.

S717 to S723 are the same as S620 to S626. Details are not described herein again.

In some embodiments, the communication method provided in this embodiment of this application may further include S724 to S726. S724 to S726 are respectively the same as step n to step p. Details are not described herein again.

According to the communication method shown in FIG. 7A to FIG. 7C, the application provider or the first network element determines a data transmission manner. A media player entity of the terminal device obtains the first data information, sends the first data information to the media session handler entity in an indirect data transmission manner, and then sends the first data information to the application entity. The application entity sends the first data information to the application provider, and the application provider sends the first data information to the first network element. In this way, indirect data reporting can be completed.

Figure 8:
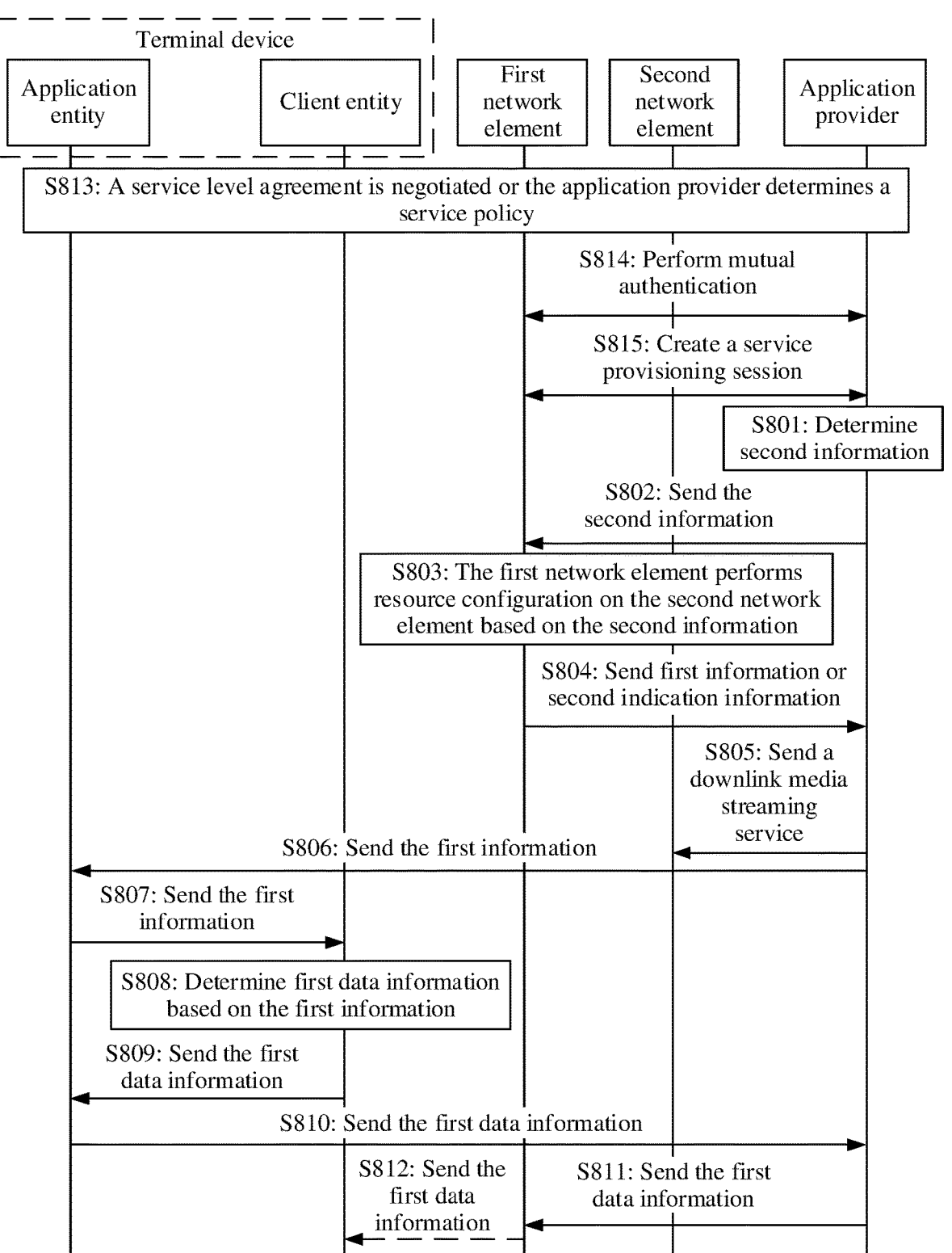
FIG. 8 is a schematic flowchart of still another communication method according to an embodiment of this application.

For example, FIG. 8 is a schematic flowchart of another communication method according to an embodiment of this application. The communication method is applicable to communication between any two nodes shown in FIG. 1. FIG. 8 is described by using an example in which first information is sent to an application entity of a terminal device through an M8 interface, and the application entity of the terminal device parses the first information and configures a client entity. FIG. 8 is applicable to general data collection, a media streaming service, or any other service type.

As shown in FIG. 8, the communication method includes the following steps.

S801: An application provider determines second information.

For a specific implementation of the second information, refer to S506 and S506*a*. Details are not described herein again.

Optionally, if a service is a media streaming service, metrics collection and reporting configuration in the second information is set to null.

S802: The application provider sends the second information to a first network element. Correspondingly, the first network element receives the second information from the application provider.

S803: The first network element may perform resource configuration on a second network element based on the second information.

For a specific implementation of S803, refer to the corresponding implementation in S502. Details are not described herein again.

S803 may be an optional step.

S804: The first network element sends the first information or second indication information to the application provider. Correspondingly, the application provider receives the first information or the second indication information from the first network element.

Optionally, the first network element may further send address information of the second network element to the application provider.

For example, the second network element may be a 5GMS AS network element.

S805: The application provider may send a downlink media streaming service to the second network element based on the address information of the second network element. Correspondingly, the second network element receives the downlink media streaming service from the application provider.

For a specific implementation of S803, refer to S612. Details are not described herein again.

S806: The application provider sends the first information to the application entity of the terminal device. Correspondingly, the application entity of the terminal device receives the first information from the application provider.

It should be noted that, for general data collection and the media streaming service, information sent by the application provider to the terminal device may include the same or different content. For general data collection, the information sent by the application provider to the terminal device may be information that is not compiled by the first network element, for example, the second information is sent, or the information sent by the application provider to the terminal device may be information that is compiled by the first network element, for example, the first information is sent.

For a specific implementation of the first information, refer to S506. Details are not described herein again.

For example, the first information may include first indication information, and may further include first address information and first addition information and/or first processing information. The first indication information may indicate that a direct data reporting manner or an indirect data reporting manner is used. A first address is an address of the application provider.

S807: The application entity of the terminal device sends the first information to the client entity of the terminal device. Correspondingly, the client entity of the terminal device receives the first information from the application entity of the terminal device.

For a specific implementation of S807, refer to the corresponding implementation in step a. Details are not described herein again.

S808: The client entity of the terminal device determines first data information based on the first information.

S809: The client entity of the terminal device sends the first data information to the application entity of the terminal device based on the first indication information. Correspondingly, the application entity of the terminal device receives the first data information from the client entity of the terminal device.

For a specific implementation of S809, refer to step f Details are not described herein again.

It is assumed that the first indication information indicates that the indirect data reporting manner is used.

S810: The application entity of the terminal device sends the first data information to the application provider based on the first indication information. Correspondingly, the application provider receives the first data information from the application entity of the terminal device.

For a specific implementation of S810, refer to S504*a*. Details are not described herein again.

Optionally, the application entity of the terminal device may add information to the first data information based on the first addition information, and/or perform, based on the first processing information, a processing action indicated by the first processing information.

S811: The application provider sends the first data information to the first network element based on the first indication information. Correspondingly, the first network element receives the first data information from the application provider based on the first indication information.

For a specific implementation of S811, refer to S505. Details are not described herein again.

Optionally, the application provider may add the information to the first data information based on the first addition information, and/or perform, based on the first processing information, the processing action indicated by the first processing information.

S812: The client entity of the terminal device sends the first data information to the first network element based on the first indication information. Correspondingly, the first network element receives the first data information from the client entity of the terminal device.

It is assumed that the first indication information indicates that the direct data reporting manner is used, and the client entity of the terminal device sends the first data information to the first network element.

S812 and S809 to S811 may be parallel solutions.

In some embodiments, the communication method provided in this embodiment of this application may further include S813 to S815. S813 to S815 are respectively the same as step n to step p. Details are not described herein again.

According to the communication method shown in FIG. 8, the client entity of the terminal device obtains the first information, and sends the first information to the application entity of the terminal device, the application entity of the terminal device sends the first data information to the application provider, and the application provider sends the first data information to the first network element. In this way, indirect data reporting can be completed.

In this application, unless otherwise specified, for same or similar parts of the embodiments, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method based on an internal logical relationship thereof. The following implementations of this application are not intended to limit the protection scope of this application.

The communication methods provided in embodiments of this application are described above in detail with reference to FIG. 5 to FIG. 8. The following describes in detail communication apparatuses provided in embodiments of this application with reference to FIG. 9 and FIG. 10.

Figure 9:
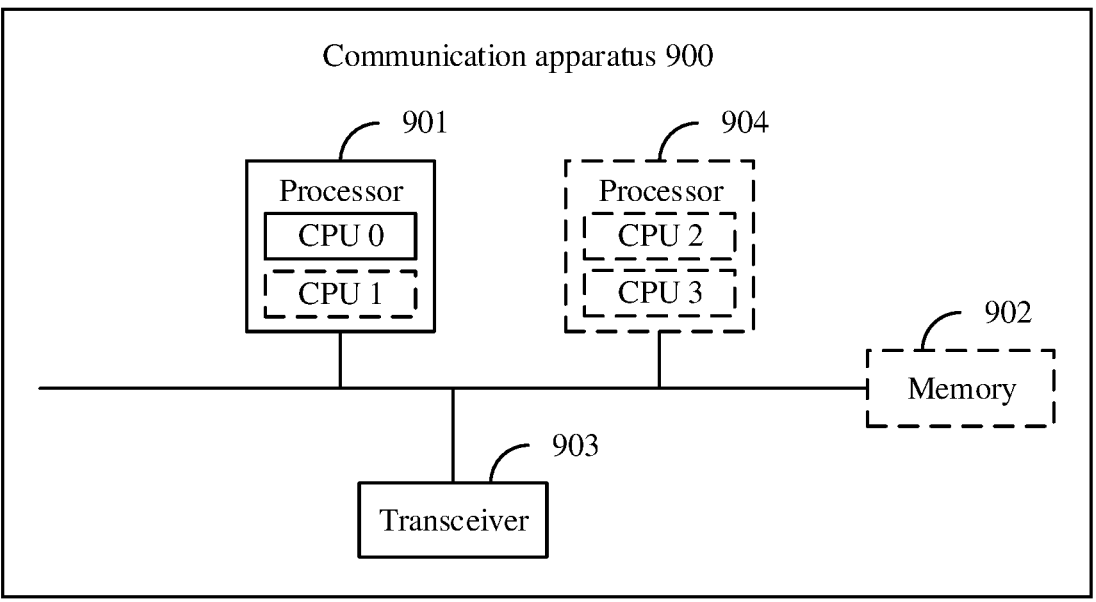
FIG. 9 is a schematic diagram of a structure of a communication apparatus according to an embodiment of this application.

FIG. 9 is a schematic diagram of a structure of a communication apparatus that may be configured to perform the communication method according to embodiments of this application. A communication apparatus 900 may be an application provider, a terminal device, or a first network element, or may be a chip applied to an application provider, a terminal device, or a first network element, or may be another component having a corresponding function. As shown in FIG. 9, the communication apparatus 900 may include a processor 901. Optionally, the communication apparatus 900 may further include one or more of a memory 902 and a transceiver 903. The processor 901 may be coupled to one or more of the memory 902 and the transceiver 903, for example, may be connected through a communication bus, or the processor 901 may be independently used.

The following specifically describes each component of the communication apparatus 900 with reference to FIG. 9.

The processor 901 is a control center of the communication apparatus 900, and may be one processor or may be a collective name of a plurality of processing elements. For example, the processor 901 may be a central processing unit (CPU), or an application-specific integrated circuit (ASIC), or may be configured as one or more integrated circuits implementing this embodiment of this application, for example, one or more digital signal processors (DSP), or one or more field programmable gate arrays (FPGA).

The processor 901 may run or execute a software program stored in the memory 902 and invoke data stored in the memory 902, to perform various functions of the communication apparatus 900.

In a specific implementation, in an embodiment, the processor 901 may include one or more CPUs, for example, a CPU 0 and a CPU 1 that are shown in FIG. 9.

In a specific implementation, in an embodiment, the communication apparatus 900 may include a plurality of processors, for example, the processor 901 and a processor 904 that are shown in FIG. 9. Each of the processors may be a single-core processor (single-CPU), or may be a multi-core processor (multi-CPU). The processor herein may be one or more communication devices, circuits, and/or processing cores configured to process data (for example, computer program instructions).

Optionally, the memory 902 may be a read-only memory (ROM) or another type of static storage communication device that can store static information and instructions, a random access memory (RAM) or another type of dynamic storage communication device that can store information and instructions, an electrically erasable programmable read-only memory (EEPROM), a compact disc read-only memory (CD-ROM) or another compact disc storage, optical disc storage (including a compressed optical disc, a laser disc, an optical disc, a digital versatile disc, a blue-ray optical disc, and the like), a magnetic disk storage medium or another magnetic storage communication device, or any other medium that can be configured to carry or store expected program code in a form of instructions or a data structure and that can be accessed by a computer. However, the memory 902 is not limited thereto. The memory 902 may be integrated with the processor 901, or may exist independently, and is coupled to the processor 901 through an input/output port (not shown in FIG. 9) of the communication apparatus 900. This is not specifically limited in this embodiment of this application.

For example, the input port may be configured to implement a receiving function performed by the application provider, the terminal device, or the first network element in any one of the foregoing method embodiments, and the output port may be configured to implement a sending function performed by the application provider, the terminal device, or the first network element in any one of the foregoing method embodiments.

The memory 902 may be configured to store a software program for performing solutions of this application, and the processor 901 controls execution of the software program. For the foregoing specific implementation, refer to the following method embodiments. Details are not described herein again.

Optionally, the transceiver 903 is configured to communicate with another communication apparatus. For example, when the communication apparatus 900 is the application provider, the transceiver 903 may be configured to communicate with the terminal device or the first network element. For another example, when the communication apparatus 900 is the terminal device, the transceiver 903 may be configured to communicate with the application provider or the first network element. For another example, when the communication apparatus 900 is the first network element, the transceiver 903 may be configured to communicate with the application provider or the terminal device. In addition, the transceiver 903 may include a receiver and a transmitter (not separately shown in FIG. 9). The receiver is configured to implement a receiving function, and the transmitter is configured to implement a sending function. The transceiver 903 may be integrated with the processor 901, or may exist independently, and is coupled to the processor 901 through an input/output port (not shown in FIG. 9) of the communication apparatus 900. This is not specifically limited in this embodiment of this application.

It should be noted that the structure of the communication apparatus 900 shown in FIG. 9 does not constitute a limitation on the communication apparatus. An actual communication apparatus may include more or fewer components than those shown in the figure, or combine some components, or use a different component deployment.

The actions of the application provider in FIG. 5 to FIG. 8 may be performed by the processor 901 in the communication apparatus 900 shown in FIG. 9 by indicating the application provider, the terminal device, or the first network element by invoking application program code stored in the memory 902.

The actions of the terminal device in FIG. 5 to FIG. 8 may be performed by the processor 901 in the communication apparatus 900 shown in FIG. 9 by indicating the terminal device by invoking the application program code stored in the memory 902.

The actions of the first network element in FIG. 5 to FIG. 8 may be performed by the processor 901 in the communication apparatus 900 shown in FIG. 9 by indicating the terminal device by invoking the application program code stored in the memory 902. This is not limited in this embodiment.

When the communication apparatus is the application provider, the communication apparatus 900 may perform any one or more possible designs of the application provider in the foregoing method embodiments. When the communication apparatus is the terminal device, the communication apparatus 900 may perform any one or more possible designs of the terminal device in the foregoing method embodiments. When the communication apparatus is the first network element, the communication apparatus 900 may perform any one or more possible designs of the first network element in the foregoing method embodiments.

It should be noted that all related content of the steps in the foregoing method embodiments may be cited in function description of corresponding functional modules. Details are not described herein again.

Figure 10:
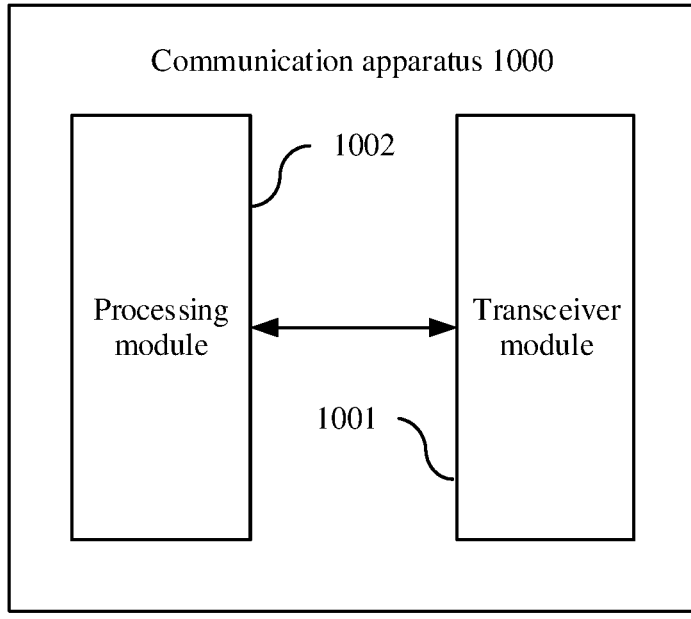
FIG. 10 is a schematic diagram of a structure of another communication apparatus according to an embodiment of this application.

FIG. 10 is a schematic diagram of a structure of another communication apparatus according to an embodiment of this application. For ease of description, FIG. 10 shows only main components of the communication apparatus.

A communication apparatus 1000 includes a transceiver module 1001 and a processing module 1002. The communication apparatus 1000 may be the application provider, the terminal device, or the first network element in the foregoing method embodiments. The transceiver module 1001 may also be referred to as a transceiver unit, and is configured to implement a transceiver function performed by the application provider, the terminal device, or the first network element in any one of the foregoing method embodiments.

It should be noted that the transceiver module 1001 may include a receiving module and a sending module (not shown in FIG. 10). The receiving module is configured to receive data and/or signaling from another device. The sending module is configured to send data and/or signaling to another device. A specific implementation of the transceiver module is not specifically limited in this application. The transceiver module may include a transceiver circuit, a transceiver machine, a transceiver, or a communication interface.

The processing module 1002 may be configured to implement a processing function performed by the application provider, the terminal device, or the first network element in any one of the foregoing method embodiments. The processing module 1002 may be a processor.

In this embodiment, the communication apparatus 1000 is presented in a form of functional modules obtained through integration. The module herein may be an ASIC, a circuit, a processor that executes one or more software or firmware programs, a memory, an integrated logic circuit, and/or another component capable of providing the foregoing functions. In a simple embodiment, a person skilled in the art may figure out that the communication apparatus 1000 may be in a form of the communication apparatus 900 shown in FIG. 9.

For example, the processor 901 in the communication apparatus 900 shown in FIG. 9 may invoke computer executable instructions stored in the memory 902, so that the communication methods in the foregoing method embodiments are performed.

Specifically, functions/implementation processes of the transceiver module 1001 and the processing module 1002 in FIG. 10 may be implemented by the processor 901 in the communication apparatus 900 shown in FIG. 9 by invoking the computer-executable instructions stored in the memory 902. Alternatively, a function/an implementation process of the processing module 1002 in FIG. 10 may be implemented by the processor 901 in the communication apparatus 900 shown in FIG. 9 by invoking the computer-executable instructions stored in the memory 902, and a function/an implementation process of the transceiver module 1001 in FIG. 10 may be implemented by the transceiver 903 in the communication apparatus 900 shown in FIG. 9.

The communication apparatus 1000 provided in this embodiment can perform the foregoing communication methods. Therefore, for technical effect that can be achieved by the communication apparatus 1000, refer to the foregoing method embodiments. Details are not described herein again.

In a possible design solution, the communication apparatus 1000 shown in FIG. 10 is applicable to the communication system shown in FIG. 1, and performs functions of the application provider in the communication methods shown in FIG. 5 to FIG. 8.

The processing module 1002 is configured to obtain first indication information. The first indication information indicates that data is transmitted between the terminal device and the first network element by using the communication apparatus.

The transceiver module 1001 is configured to receive first data information from the terminal device.

The transceiver module 1001 is further configured to send the first data information to the first network element based on the first indication information.

It should be noted that all related content of the steps in the foregoing method embodiments may be cited in function description of corresponding functional modules. Details are not described herein again.

Optionally, the communication apparatus 1000 may further include a storage module (not shown in FIG. 10). The storage module stores a program or instructions. When the processing module 1002 executes the program or the instructions, the communication apparatus 1000 can perform the functions of the application provider in the communication methods shown in FIG. 5 to FIG. 8.

It should be noted that the communication apparatus 1000 may be the application provider, or may be a chip (system) or another component or component that may be disposed in the application provider. This is not limited in this application.

In addition, for technical effect of the communication apparatus 1000, refer to technical effect of the communication methods shown in FIG. 5 to FIG. 8. Details are not described herein again.

In another possible design solution, the communication apparatus 1000 shown in FIG. 10 is applicable to the communication system shown in FIG. 1, and performs functions of the terminal device in the communication methods shown in FIG. 5 to FIG. 8.

The processing module 1002 is configured to obtain first indication information. The first indication information indicates that data is transmitted between the communication apparatus and the first network element via the application provider.

The transceiver module 1001 is configured to send first data information to the application provider based on the first indication information.

It should be noted that all related content of the steps in the foregoing method embodiments may be cited in function descriptions of corresponding functional modules. Details are not described herein again.

Optionally, the communication apparatus 1000 may further include a storage module (not shown in FIG. 10). The storage module stores a program or instructions. When the processing module 1002 executes the program or the instructions, the communication apparatus 1000 can perform the functions of the terminal device in the communication methods shown in FIG. 5 to FIG. 8.

It should be noted that the communication apparatus 1000 may be the terminal device, or may be a chip (system) or another component or component that may be disposed in the terminal device. This is not limited in this Terminal device In addition, for technical effect of the communication apparatus 1000, refer to technical effect of the communication methods shown in FIG. 5 to FIG. 8. Details are not described herein again.

In still another possible design solution, the communication apparatus 1000 shown in FIG. 10 is applicable to the communication system shown in FIG. 1, and performs functions of the first network element in the communication methods shown in FIG. 5 to FIG. 8.

The processing module 1002 is configured to obtain first indication information. The first indication information indicates that data is transmitted between the terminal device and the communication apparatus via the application provider.

The transceiver module 1001 is configured to receive first data information from the application provider based on the first indication information.

It should be noted that all related content of the steps in the foregoing method embodiments may be cited in function descriptions of corresponding functional modules. Details are not described herein again.

Optionally, the communication apparatus 1000 may further include a storage module (not shown in FIG. 10). The storage module stores a program or instructions. When the processing module 1002 executes the program or the instructions, the communication apparatus 1000 can perform functions of the first network element in the communication methods shown in FIG. 5 to FIG. 8.

It should be noted that the communication apparatus 1000 may be the first network element, or may be a chip (system) or another component or component that may be disposed in the first network element. This is not limited in this application.

In addition, for technical effect of the communication apparatus 1000, refer to technical effect of the communication methods shown in FIG. 5 to FIG. 8. Details are not described herein again.

An embodiment of this application provides a communication system. The communication system includes an application provider, a terminal device, and a first network element.

The application provider is configured to perform actions of the application provider in the foregoing method embodiments. For a specific execution method and process, refer to the foregoing method embodiments. Details are not described herein again.

The terminal device is configured to perform actions of the terminal device in the foregoing method embodiments. For a specific execution method and process, refer to the foregoing method embodiments. Details are not described herein again.

The first network element is configured to perform actions of the first network element in the foregoing method embodiments. For a specific execution method and process, refer to the foregoing method embodiments. Details are not described herein again.

An embodiment of this application provides a chip system. The chip system includes a logic circuit and an input/output port. The logic circuit may be configured to implement a processing function related to the communication method according to embodiments of this application, and the input/output port may be configured to perform a receiving and sending function related to the communication method according to embodiments of this application.

For example, the input port may be configured to implement a receiving function related to the communication method according to embodiments of this application, and the output port may be configured to implement a sending function related to the communication method according to embodiments of this application.

For example, the processor in the communication apparatus 900 may be configured to perform, for example, but not limited to, baseband-related processing, and the transceiver in the communication apparatus 900 may be configured to perform, for example, but not limited to, radio frequency receiving and sending. The foregoing components may be separately disposed on chips independent of each other, or at least some or all of the components may be disposed on a same chip. For example, the processor may be divided into an analog baseband processor and a digital baseband processor. The analog baseband processor and a transceiver may be integrated on a same chip, and the digital baseband processor may be disposed on an independent chip. With continuous development of integrated circuit technologies, more and more components may be integrated on a same chip. For example, the digital baseband processor may be integrated on a same chip with a plurality of application processors (for example, but not limited to a geometric processor and a multimedia processor). The chip may be referred to as a system on chip (system on chip). Whether components are independently disposed on different chips or are integrated and disposed on one or more chips usually depends on specific requirements of a product design. Specific implementation forms of the foregoing components are not limited in this embodiment of the present invention.

In a possible design, the chip system further includes a memory, and the memory is configured to store program instructions and data for implementing a function related to the communication method according to embodiments of this application.

The chip system may include a chip, or may include a chip and another discrete component.

An embodiment of this application provides a computer-readable storage medium. The computer-readable storage medium includes a computer program or instructions. When the computer program or the instructions are run on a computer, the communication method according to embodiments of this application is performed.

An embodiment of this application provides a computer program product. The computer program product includes a computer program or instructions. When the computer program or the instructions are run on a computer, the communication method according to embodiments of this application is performed.

It should be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory in embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example, and not limitative description, many forms of random access memories (RAM) can be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented using software, hardware (for example, circuit), firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases: only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In this application, at least one means one or more, and a plurality of means two or more. At least one of the following items (pieces) or a similar expression thereof refers to any combination of these items, including any combination of singular items (pieces) or plural items (pieces). For example, at least one of a, b, or c may indicate: a, b, c, a-b, a-c, b-c, or a-b-c, where a, b, and c may be singular or plural.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief descriptions, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in embodiments.

In addition, functional units in the embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
obtaining, by an application provider, first indication information indicating that data is to be transmitted between a terminal device and a first network element via the application provider;
receiving, by the application provider, first data information from the terminal device; and
sending, by the application provider, the first data information to the first network element based on the first indication information.

2. The communication method according to claim 1, wherein the first indication information comprises first address information including a first address, the first address information indicating the first address to which the data is to be sent.

3. The communication method according to claim 1, further comprising:
obtaining, by the application provider, first information or second indication information; and
sending, by the application provider, the first information or the second indication information to the terminal device and determining first data information based on the first information, and the second indication information indicates the first information.

4. The communication method according to claim 3, wherein the first information comprises the first indication information.

5. The communication method according to claim 1, wherein the obtaining first indication information by the application provider comprises:
determining, by the application provider, the first indication information; or
receiving, by the application provider, the first indication information from the first network element.

6. The communication method according to claim 1, further comprising:
sending, by the application provider, the first indication information to the first network element.

7. The communication method according to claim 1, further comprising:
sending, by the application server, the first indication information to the terminal device.

8. The communication method according to claim 7, wherein the sending, by the application server, the first indication information to the terminal device comprises:

sending, by the application provider, the first indication information to an application entity of the terminal device.

9. A communication method, comprising:
obtaining, by a terminal device, first indication information, the first indication information indicating that data is to be transmitted between the terminal device and a first network element via an application provider; and
sending, by the terminal device, first data information to the application provider based on the first indication information.

10. The communication method according to claim 9, wherein the first indication information comprises first address information including a first address, the first address information indicating to send data to the first address.

11. The communication method according to claim 9, further comprising:
receiving, by the terminal device, first information or second indication information from the application provider; and
determining the first data information based on the first information, the second indication information indicating the first information.

12. The communication method according to claim 9, wherein the obtaining first indication information by the terminal device comprises:
receiving, by the terminal device, the first indication information from the application provider; or
receiving, by the terminal device, the first indication information from the first network element.

13. The communication method according to claim 9, further comprising:
sending, by an application entity of the terminal device, the first indication information to a client entity of the terminal device.

14. The communication method according to claim 9, further comprising:
sending, by a client entity of the terminal device, the first data information to an application entity of the terminal device based on the first indication information.

15. The communication method according to claim 9, further comprising:
sending, by a media session handler entity of the terminal device client entity, the first data information to the application entity of the terminal device based on the first indication information.

16. A communication method, comprising:
obtaining, by a first network element, first indication information indicating that data is to be transmitted between a terminal device and the first network element via an application provider; and
receiving, by the first network element, first data information from the application provider based on the first indication information.

17. The communication method according to claim 16, wherein the first indication information comprises first address information including a first address, the first address information indicating the first address to which the data is to be sent.

18. The communication method according to claim 16, further comprising:
obtaining, by the first network element, first information or second indication information; and
determining first data information based on the first information, the second indication information indicating the first information.

19. The communication method according to claim 18, wherein the obtaining, by the first network element, first information or second indication information comprises:

determining, by the first network element, the first information or the second indication information based on the first indication information.

20. The communication method according to claim 16, wherein the obtaining the first indication information by the first network element comprises:

receiving, by the first network element, the first indication information from the application provider; or determining, by the first network element, the first indication information.

21. An apparatus, comprising:

at least one processor; and one or more memories coupled to the at least one processor and storing instructions for execution by the at least one processor that, upon execution, cause the apparatus to perform operations including:

obtaining first indication information indicating that data is to be transmitted between a terminal device and a first network element via an application provider;

receiving first data information from the terminal device; and sending the first data information to the first network element based on the first indication information.

22. An apparatus, comprising:

at least one processor; and one or more memories coupled to the at least one processor and storing instructions for execution by the at least one processor that, upon execution, cause the apparatus to perform operations including:

obtaining first indication information, the first indication information indicating that data is to be transmitted between the terminal device and a first network element via an application provider; and sending first data information to the application provider based on the first indication information.

* * * * *